United States Patent [19]

Soenen et al.

[11] Patent Number: 6,028,527

[45] Date of Patent: *Feb. 22, 2000

[54] DECRYPTION AND ENCRYPTION TRANSMITTER/RECEIVER WITH SELF-TEST, LEARN AND ROLLING CODE

[75] Inventors: Eric G. Soenen; Angela C. Dycus, both of Plano, Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,285

[22] Filed: Nov. 25, 1996

[51] Int. Cl.[7] ........................... G06F 7/04
[52] U.S. Cl. ................ 340/825.31; 340/825.72; 340/825.31; 340/539; 455/352
[58] Field of Search .............. 340/825.31, 825.69, 340/825.72, 539, 825.34; 455/352; 375/364, 238; 380/23; 327/564; 341/176

[56] References Cited

U.S. PATENT DOCUMENTS 5,471,668  11/1995  Soenen et al. ..................... 455/352

*Primary Examiner*—Michael Horabik
*Assistant Examiner*—Jean B. Jeanglaude
*Attorney, Agent, or Firm*—W. Daniel Swayze, Jr.; Wade James Brady, III; Richard L. Donaldson

[57] ABSTRACT

A computer implemented method transmits and receives an information signal. A common start position is established for the receive mode where the information signal is received and a transmit mode where the information signal is transmitted. Either the receive mode to receive the information signal or the transmit mode to transmit the information signal is entered subsequent to establishing the common position. The start position is returned to after the receive mode the transmit the learn mode and the self-test mode has been entered.

3 Claims, 25 Drawing Sheets

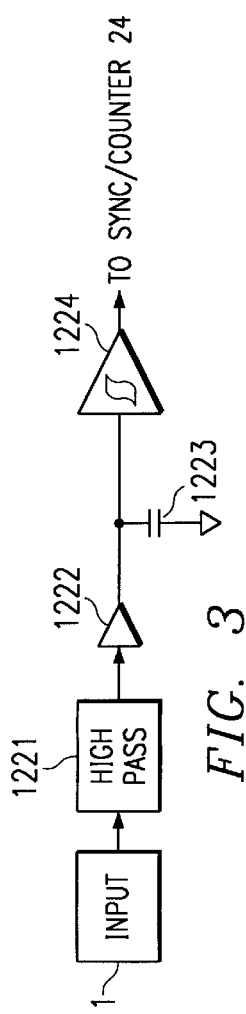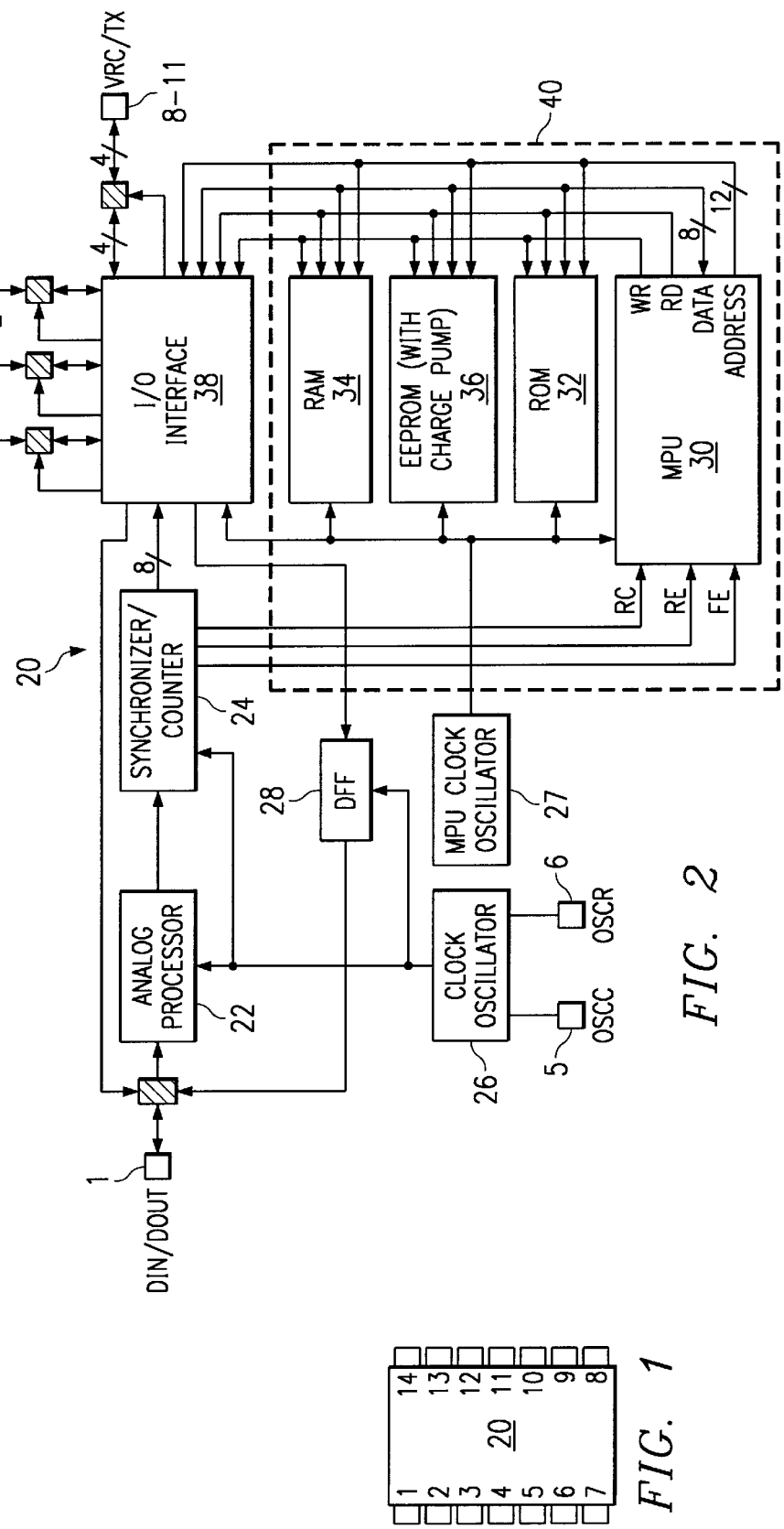

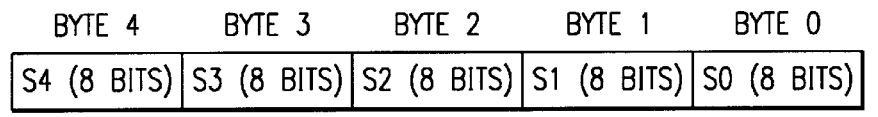
FIG. 13
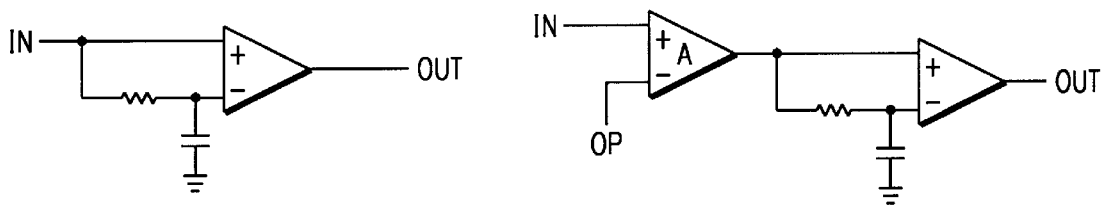
FIG. 14
(PRIOR ART)
FIG. 15
(PRIOR ART)
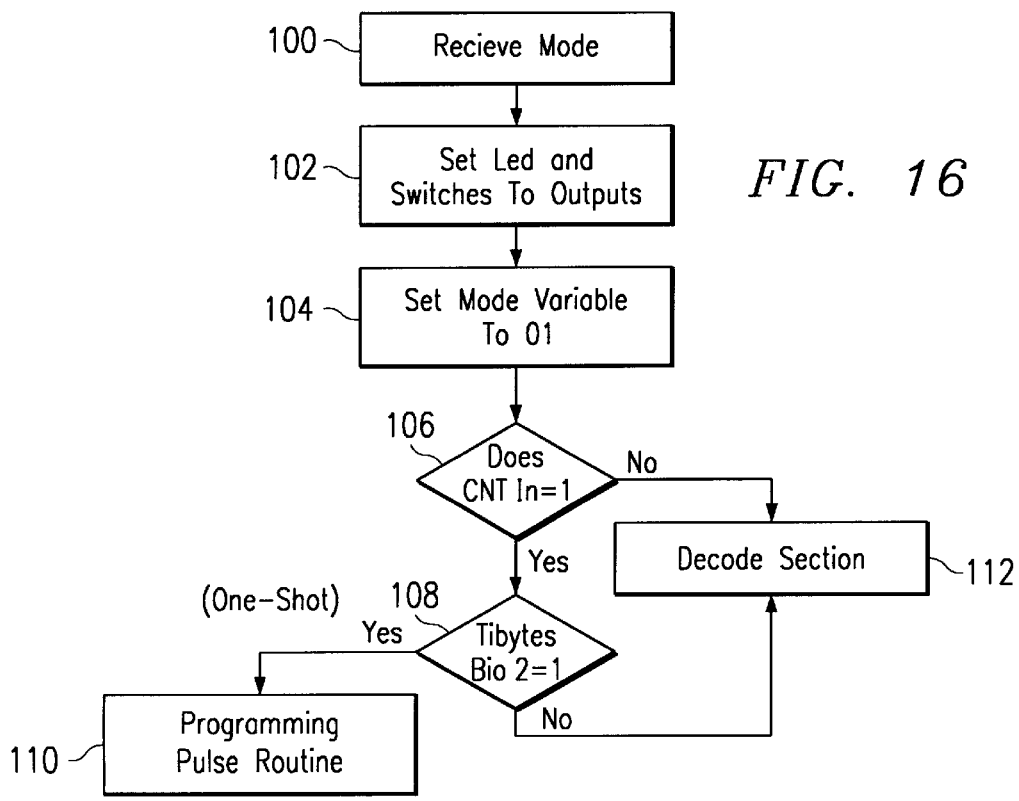
FIG. 16

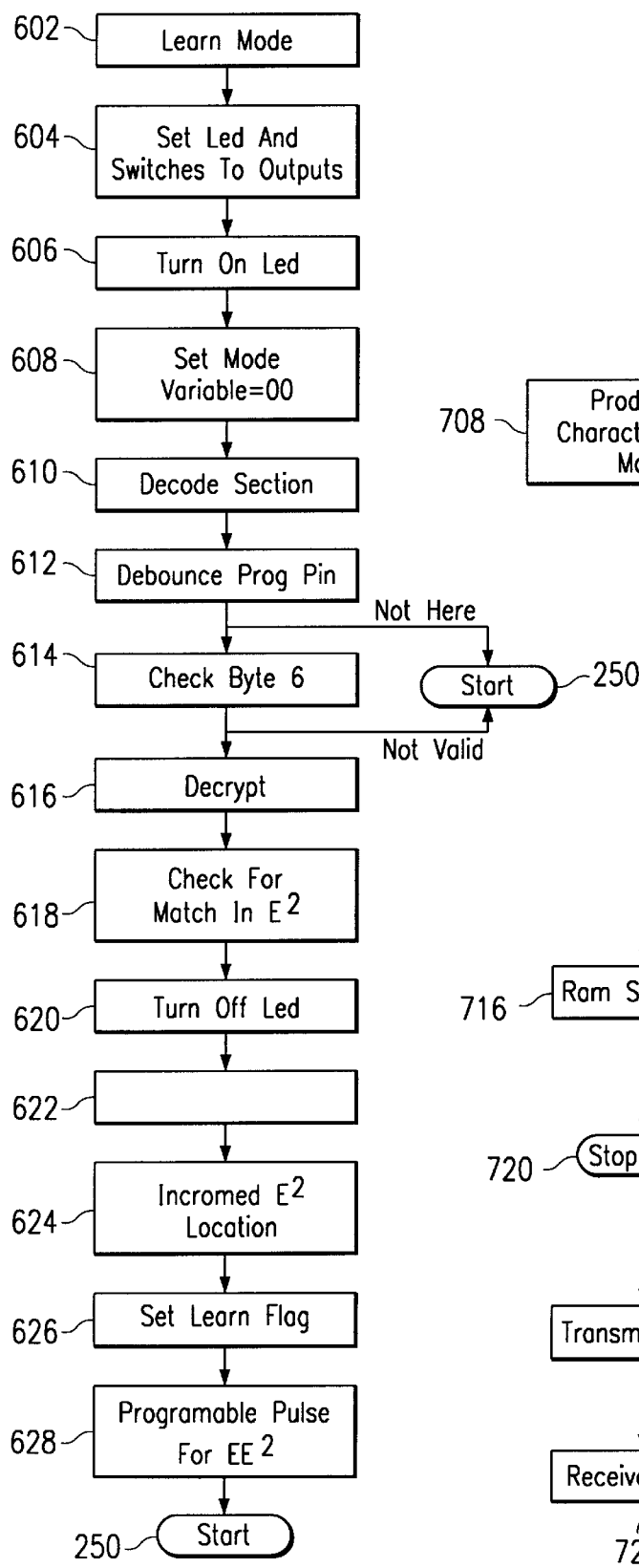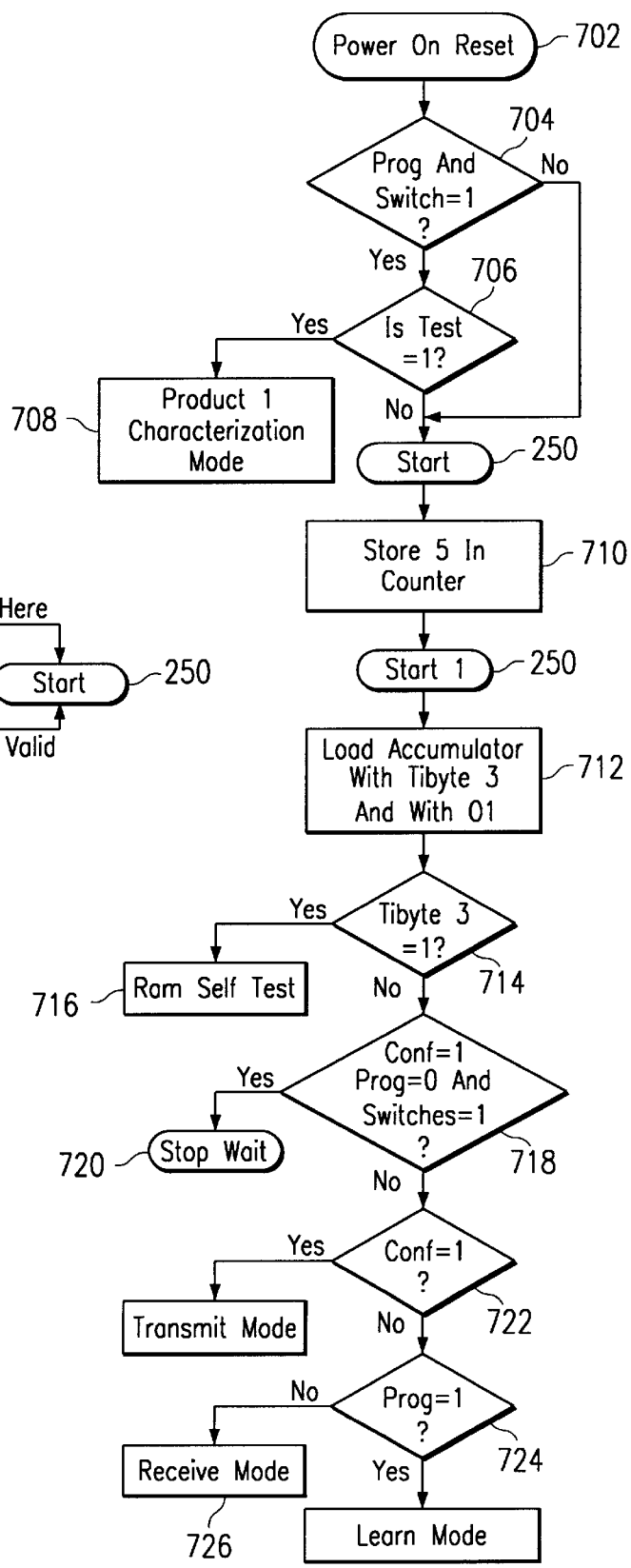

FIG. 24
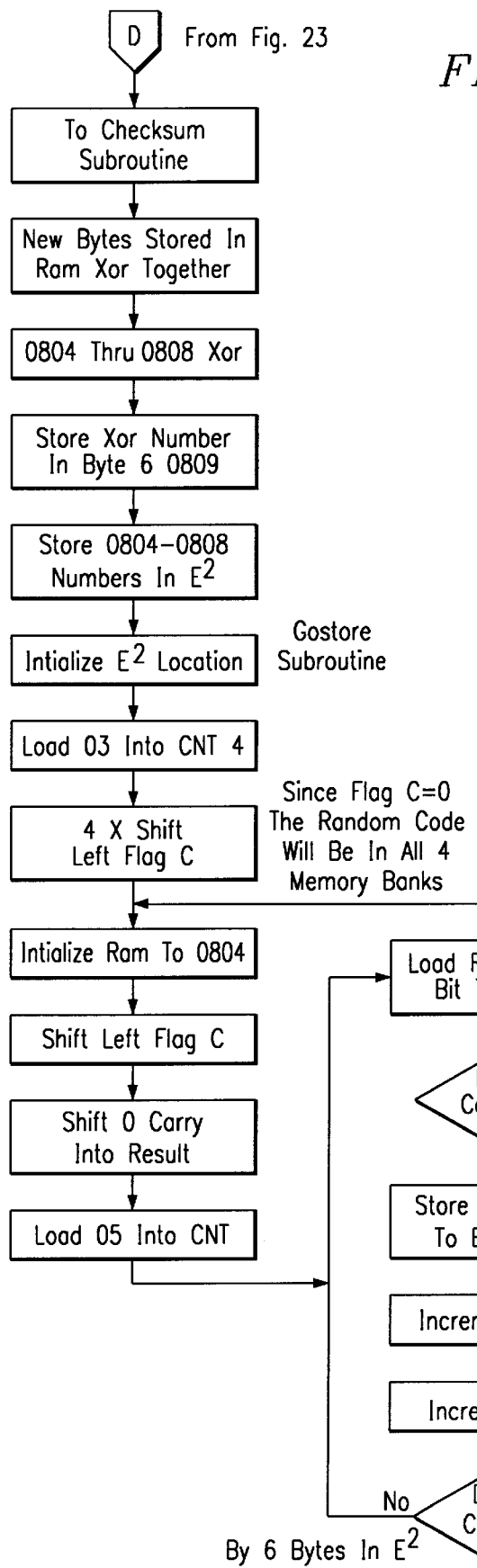
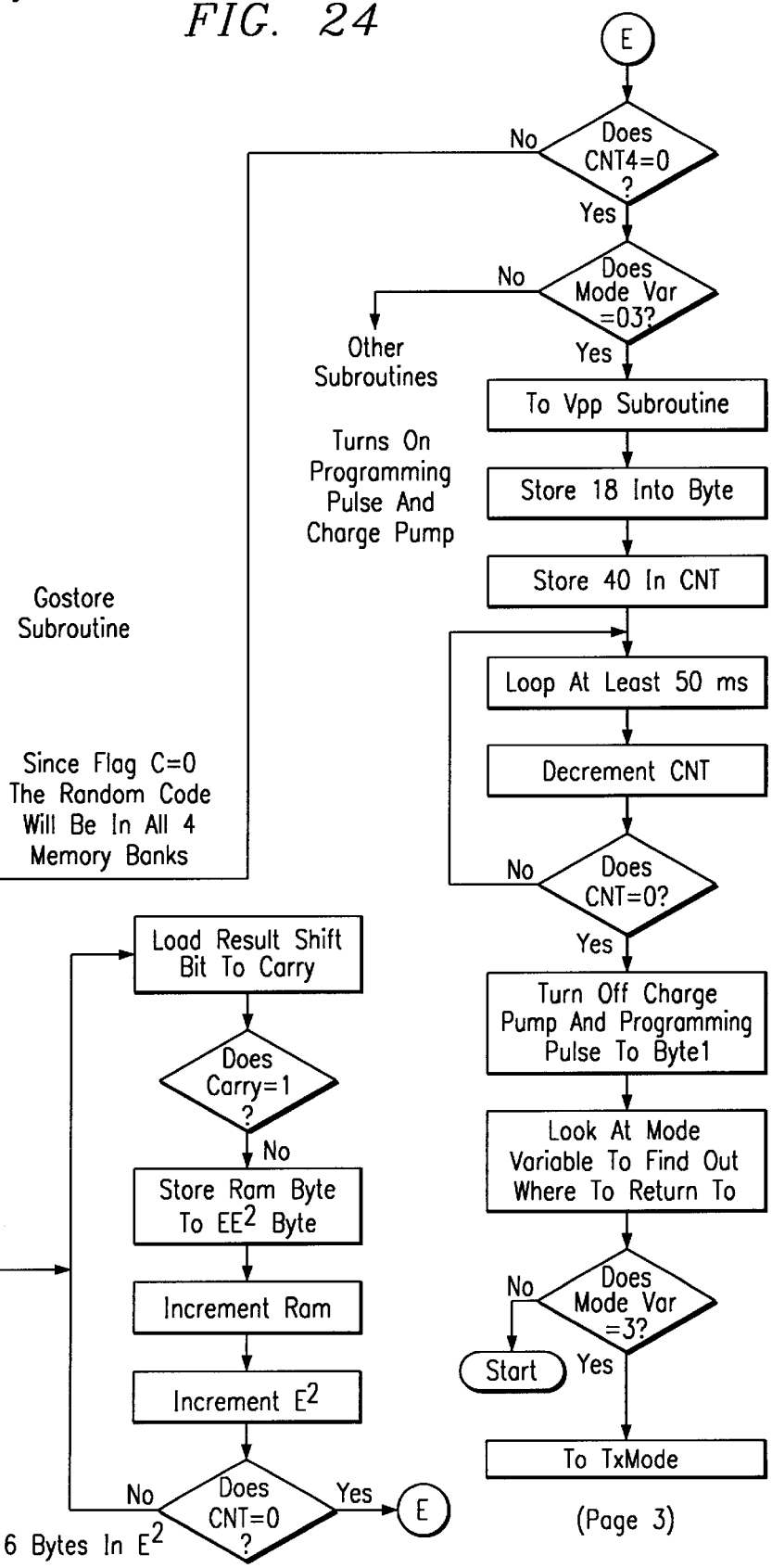
(Page 3)

* For Ptrold=2

* Ptr Old Valve Is Moved Into Cntr

DECRYPTION AND ENCRYPTION TRANSMITTER/RECEIVER WITH SELF-TEST, LEARN AND ROLLING CODE

CROSS REFERENCE TO RELATED APPLICATIONS

This application is related to the following coassigned applications filed on Jun. 15, 1994: TI-19359 bearing Ser. No. 08/260,148; TI-19360 bearing Ser. No. 08/259,819; TI-19363 bearing Ser. No. 08/259,803; and, TI-19365 bearing Ser. No. 08/259,820. This application is also related to the following coassigned applications: TI-19361 bearing Ser. No. 08/408,661; TI-19362 bearing Ser. No. 08/409,227; TI-19364 bearing Ser. No. 08/408,874; and, TI-20262 bearing Ser. No. 08/408,809. All of the above applications are incorporated by reference in their entirety.

FIELD OF INVENTION

This invention is in the field of data communications and more particularly relates to decoding a pulse width modulated serial data stream.

BACKGROUND OF INVENTION

Remote control or remote access systems use a transmitter and a receiver. An exemplary example is a garage door opener system where a transmitter is contained in a remote control unit and a receiver is connected to a garage door motor. The transmitter and receiver typically include different integrated circuits. When activated, the transmitter sends a serial data stream to the receiver by encoding the data and modulating it onto a radio frequency of infrared carrier.

Data encoding (on the transmitter side) into a pulse width modulated format is usually straight-forward. However, decoding (on the receiver side) can be a more complicated operation. Typically, the demodulated incoming signal must be analyzed by comparing the relative width of the incoming pulses, in order to determine which ones represent a logic 1 and which ones represent a logic 0. In addition, a "preamble" or synchronization sequence may be present. The decoding operation usually requires the measurement of high and low times within the waveform. The unit of time is usually determined by a data clock that is typically an external resistor/capacitor RC oscillator.

One convenient way to perform the decoding operation is to use a general-purpose microcontroller, on which the decoding method is implemented in software. However, in order to perform the operation real-time, the controller usually has to run very fast, or a complex structure of interrupts needs to be established. These are strong disadvantages in products where the controller must be kept small (for cost reasons) and running slow (for low power consumption).

It is accordingly an object of the invention to provide an apparatus having a microcontroller and method to decode a pulse-width modulated serial data stream.

Other objects and advantages of the invention will be apparent to those of ordinary skill in the art having the benefit of the specification and drawings herein.

SUMMARY OF INVENTION

A pulse width modulated serial data stream is advantageously decoded using a microcontroller, a counter and an external clock signal. Edge detection circuitry detects the rising and the falling edge of the incoming data pulse. An external clock signal clocks a counter to determine how many clock signals the incoming pulse corresponds to. The microcontroller polls the counter on the rising edge and the falling edge and is free to perform other task otherwise without the necessity of using interrupts.

The present invention includes a method for receiving an information signal including the steps of establishing a common start position for at least a receive mode where the information signal is received and a transmit mode where the information signal is transmitted, entering either the receive mode to receive the information signal or the transmit mode to transmit the information signal, and returning to the start position after the receive mode or the transit mode had been entered. Thus, a common start point is established to activate either the transmit mode or the receive mode, and then, returned to the start mode so the device is able to enter again either the transmit mode or the receive mode.

The present invention also includes the steps of establishing the start point so that a learn mode can be entered subsequent to the start position. Additionally, after the learn mode has been entered the start position may again be entered. From the start position either the receive mode, the transmit mode or the learn mode can subsequently and successfully be entered. Additionally, the present invention includes a self-test mode that can be entered after the start position has been entered. The self-test mode tests a reconfigurable receiver/transmitter. After the start position has been entered the self-test mode is entered. And then, after the self-test mode has entered, the start position is again entered allowing ether the receive mode, the transmit mode, the learn mode or the self-test mode to subsequently and successfully be entered. This provides a flexible receiver/transmitter that provides for entering various modes.

BRIEF DESCRIPTION OF DRAWINGS

FIG. 1 is a pin layout of an integrated circuit SMART device incorporating the invention;

FIG. 2 is an architectural block diagram of the integrated circuit device of FIG. 1;

FIG. 3 is a schematic diagram of the analog processor 22 of FIG. 2;

FIG. 13 is a drawing illustrating the 40 bit code divided into 5 bytes of 8 bits each;

FIG. 14 is a prior art drawing illustrating a self biasing comparator for signal shaping;

FIG. 15 is a prior art drawing illustrating an amplifier stage in front of a comparator for signal shaping;

FIG. 16 illustrates the flow chart for the receive mode;

FIG. 21 illustrates the flow chart for the learn mode;

FIG. 22 illustrates a flow chart of the power/on reset;

FIGS. 23–27 illustrates the transmit mode;

DESCRIPTION OF APPENDICES

Figure 6:
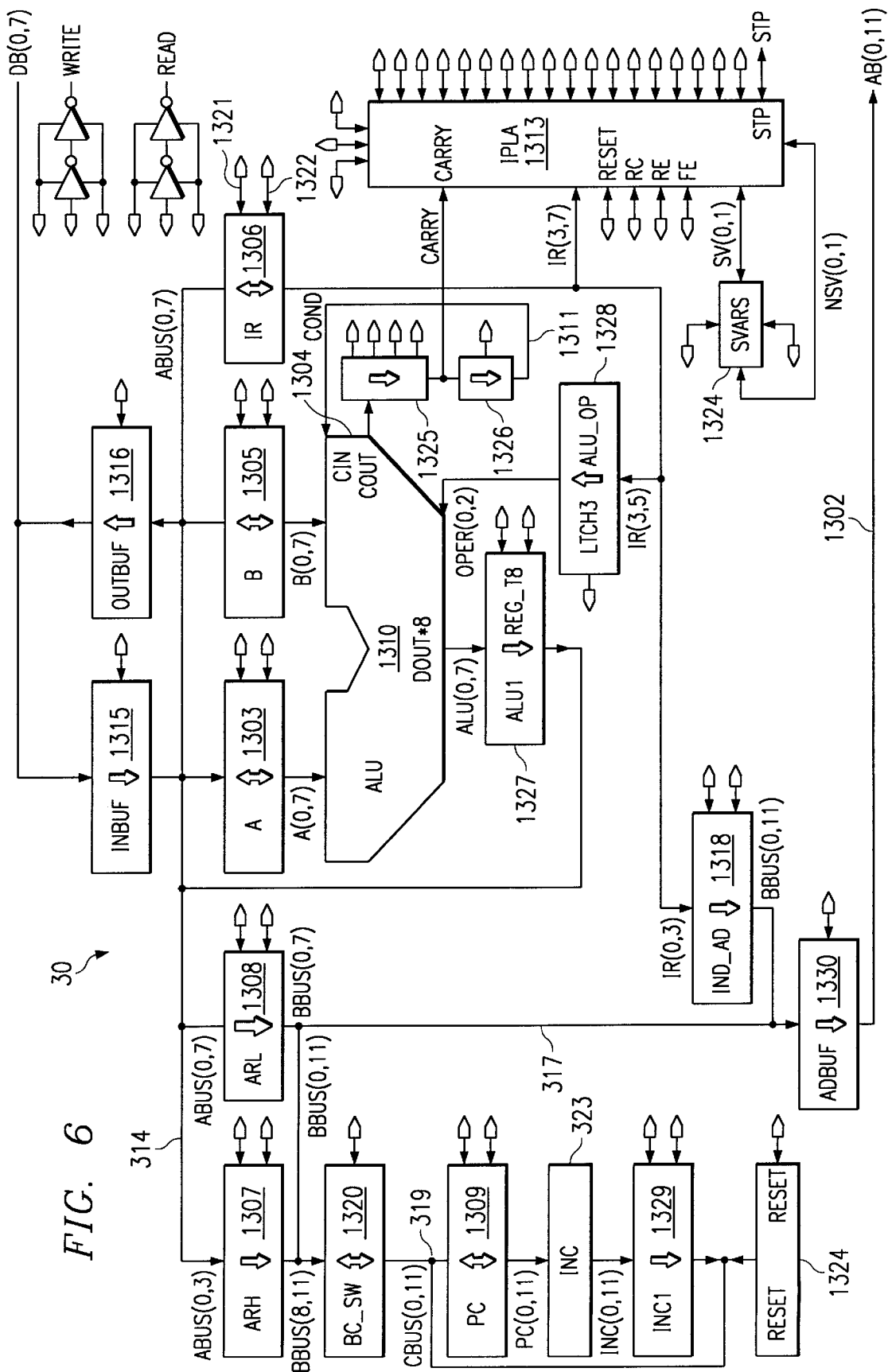
FIG. 6 is a block diagram an inventive processor core.

Appendix 1, pages 1–6, contains a listing of instructions for MPU 30 of FIG. 6.

Appendix 2, pages 1–3, contains an extended listing of the Instruction Programmable Logic Array 1313 of MPU 30 of FIG. 6.

Appendix 3, page 1, contains a simplified listing of the Instruction Programmable Logic Array 1313 of MPU 30 of FIG. 6.

Appendix 4, page 1, contains an illustration of the first ten encryption outputs of the 1 trillion possible codes.

Appendix 5, pages 1–2 contain an encryption/decryption example.

Appendix 6, pages 1–6 contain the program used in the rolling code method.

Appendix 7, contains the program used for the various modes of the invention.

DETAILED DESCRIPTION OF PREFERRED EMBODIMENT

FIG. 1 is a drawing illustrating a pin layout of an integrated circuit 20 incorporating the invention. As will be explained later in detail, integrated circuit 20 contains circuitry that advantageously allows it to perform as a transmitter and as a receiver. It additionally includes learn capability. Integrated circuit 20 may have 14 pins and may be packaged in a dual in-line plastic and small outline surface-mount package. Table 1 provides a description of the pins. A discussion of selected pins thereafter follows.

TABLE 1

| PIN | N | I/O | DESCRIPTION |
| --- | --- | --- | --- |
| DIN/DOUT | 1 | I/O | Serial data input/output. In the receive mode, DIN/DOUT becomes an input to receive serial data from up to four transmitters. In the learn mode, DIN/DOUT becomes an input to learn code from up to four transmitters. In the transmit mode, DIN/DOUT becomes an output for the transmitted data. Clocked by the internal variable oscillator. |
| CONF | 2 | I | Device configuration bit. When set to is at a high logic level, the device assumes the transmitter mode (CONF is internally pulled up, and no connection to this terminal is required for the TX mode of operation). When set to a low logic level, the device assumes the receiver mode. When held to Vcc/2, the device enters a self-test mode. |
| PROG | 3 | I | Programming enable. When set to a logic low state, the device operates as a transmitter or receiver. When PROG is momentary held to a logic-high state, the device enters the programming mode. PROG is internally pulled down and debounced. |
| LED | 4 | O | Transmit, receive, and program indication. In the transmit mode, LED assumes a low state for the duration of the transmitted data time (15 frames). In the program mode, LED assumes a low state until the device has successfully received and stored 40-bits of code from DIN/DOUT. LED is internally connected to a current source so that a LED indicator can be connected directly to this pin with no external current limiting resistor over the full range of operating voltage. |
| OSCC | 5 | I/O | Internal oscillator frequency control. A capacitor connected from OSCC to Vcc and a resistor connected from OSCR to OSCC determines the speed of the internal oscillator. The capacitor connected from OSCC to Vcc is optional. |
| OSCR | 6 | I/O | Internal oscillator frequency control. A resistor connected to from OSCR to OSCC determines the speed of the internal oscillator (used in conjunction with an optional capacitor connected from OSCC to Vcc). |
| GND | 7 | | Analog and logic ground. |
| VRC/TXI | 8 | I/O | Channel 1 VRC (valid received code) output and channel 1 TX enable. In the receive mode, VCR/TX1 is an output and toggles to a logic-low state when the device receives the current 40-bits of security code and channel data (4 bits) matching channel 1. In the transmit mode, VRC/TX1 is an input used to enable transmission of channel-1. When VCR/TX1 is pulled to GND, the device transmits the channel 1 |

TABLE 1-continued

| PIN | N | I/O | DESCRIPTION |
|---|---|---|---|
| | | | code sequence stored in EEPROM memory from DIN/DOUT 15 times. The device will not transmit code again until VCR/TX1 is again pulled to GND. VRC/TX1 has an internal pull up resistor in both transmitter and receiver modes and switch debouncing in the transmitter mode. |
| VRC/TX2 | 9 | I/O | Channel 2 VRC (valid received code) output and channel 2 TX enable. In the receive mode, VCR/TX2 is an output and toggles to a logic-low state when the device receives the current 40-bits of security code and channel data (4 bits) matching channel 2. In the transmit mode, VRC/TX2 is an input used to enable transmission of channel-2. When VCR/TX2 is pulled to GND, the device transmits the channel 2 code sequence stored in EEPROM memory from DIN/DOUT 15 times. The device will not transmit code again until VCR/TX2 is again pulled to GND. VRC/TX2 has an internal pull up resistor in both transmitter and receiver modes and switch debouncing in the transmitter mode. |
| VRC/TX3 | 10 | I/O | Channel 3 VRC (valid received code) output and channel 3 TX enable. In the receive mode, VCR/TX3 is an output and toggles to a logic-low state when the device receives the correct 40-bits of security code and channel data (4 bits) matching channel 3. In the transmit mode, VRC/TX3 is an input used to enable transmission of channel-3. When VCR/TX3 is pulled to GND, the device transmits the channel 3 code sequence stored in EEPROM memory from DIN/DOUT 15 times. The device will not transmit code again until VCR/TX3 is again pulled to GND. VRC/TX3 has an internal pull up resistor in both the transmitter and receiver modes and switch debouncing in the transmitter mode. |
| VRC/TX4 | 11 | I/O | Channel 4 VRC (valid received code) output and channel 4 TX enable. In the receive mode, VCR/TX4 is an output and toggles to a logic-low state when the device receives the correct 40-bits of security code and channel data (4 bits) matching channel 4. In the transmit mode, VRC/TX4 is an input used to enable transmission of channel-4. When VCR/TX4 is pulled to GND, the device transmits the channel 4 code sequence stored in EEPROM memory from DIN/DOUT 15 times. The device will not transmit code again until VCR/TX4 is again pulled to GND. VRC/TX4 has an internal pull up resistor in both the transmitter and receiver modes and switch debouncing in the transmitter mode. |
| VCC | 13 | | +2.5 to +15 V (TRC1315 only) |
| Test | 12 | I | When test is connected to VCC. The device enters the self-test mode. |
| VCC/CAP | 14 | | +2.7 to +6 V (TRC1300 only) or 11F capacitor from CAP to ground (TRC1315 only) |

Integrated circuit (IC) 20 has 8 main functional pins, named LED, CONF, PROG, DIN/DOUT and VRC/TX (4 times). In the embodiment described herein, some are always inputs (CONF, PROG), some are always outputs (LED) and some are either, depending on the mode of operation (DIN/DOUT, VRC/TX). All 8 pins are advantageously implemented as bi-directional I/O ports, mapped in the memory space of a micro-controller (later described with reference to FIG. 2). This makes it possible to define any pin as either an input or an output, depending on software. Input/output (I/O) interface circuitry (later described with reference to FIG. 2) is implemented as two 8-bit registers: a direction register which is used to define the data direction on the pin, and a data register, which is used to write data to when a pin is defined as an output.

In FIG. 1, configuration (CONF) pin 2 is used as an input only. When a logic high is detected on this pin by the micro-controller, the device enters the transmit mode. In that mode, IC 20 reads 4 bits of parallel data from the VRC/TX pins, encodes them into serial digital format and outputs them onto the DIN/DOUT pin. When a logic low is detected on the CONF pin, IC 20 enters the receive mode. In that mode, IC 20 reads serial data on the DIN/DOUT pin, decodes it, and if the correct security code is present, outputs the information onto the 4 VRC/TX pins.

In FIG. 1, data input data output (DIN/DOUT) pin 1 is used for the serial digital data stream. When the system is in transmit mode, this pin is configured as an output. A serial pattern representing identification code and data is output onto this pin by the micro-controller and code stored in EEPROM 40 of FIG. 2. When the system is in receive mode, this pin is used as an input. A low-level, potentially noisy signal from the receive section of the system (external to IC 20) is read from this pin into the analog processor 22 of FIG. 2. After analog processing and digital filtering, the original serial data stream is reproduced. Identification code and data are then recovered through a decoding process which may be implemented in software.

In FIG. 1, valid received code/ transmit (VRC/TX) pins 8–11 are used for parallel digital information as is normally the state of push-button switches that will be connected to the pins when configured as a transmitter. When IC 20 is in transmit mode, these pins are configured as inputs. They are debounced and read by micro-controller 40 of FIG. 2. The 4 bits of parallel data and other data are then transmitted serially, together with an identification code (later explained). When IC 20 is in receive mode, these pins are used as outputs. The 4 bits of information extracted from the serial data stream by a decoding process are written to these pins. As a result, the parallel data outputs on the receiver side will match the parallel data inputs on the transmitter side (provided a valid identification code (as explained below) exists).

In FIG. 1, program (PROG) pin 3 is used as an input only. When a logic high is detected on this pin by the microcontroller of FIG. 2, the device enters the learn (program) mode. In that mode, IC 20 waits for successful reception of data from a transmitter. After the data is decoded, the identification code is extracted and stored in non-volatile memory 36 shown in FIG. 2. From that point on, that transmitter (that identification code) becomes "authorized" on that receiver.

Still with reference to FIG. 1 and PROG pin 3, the learn mode causes a non-volatile flag in non-volatile memory 36 of FIG. 2 to be set, which causes IC 20 to "remember" that it has been programmed as a receiver. If afterwards, the device is configured for transmit mode, the flag causes stored identification codes to be deleted and new random code is stored in memory. This advantageous feature, called "transmitter-lock", improves security. It makes it impossible to "eavesdrop" and learn an identification code from an authorized user while in learn mode, with the intent of reproducing it afterwards and gain unauthorized access.

In FIG. 1, LED pin 4 is used as an output only. When a logic high is written to by the micro-controller of FIG. 2, a regulated current is output. This current can drive an light emitting diode, LED, directly. As such LED pin 4 is used to indicate learn mode completion of a self-test, and transmit mode.

Turning now to FIG. 2, an architectural block diagram of IC 20 is illustrated. IC 20 includes an analog processor 22, a synchronizer/counter 24, a clock oscillator 26, a main processing unit (MPU) oscillator 27, a data flip-flop 28, a main processing unit (MPU) 30, a read only memory (ROM) 32, a random access memory (RAM) 34, a non-volatile electrically erasable programmable random access memory (EEPROM) 36, and input/output interface circuitry 38. A description of the circuit blocks of FIG. 2 follows.

In FIG. 2, analog processor block 22 processes the incoming serial data stream from DIN/DOUT pin 1. Its input consists of the raw, demodulated signal from an external radio-frequency (or direct wired or infrared) receive section. As such, it is only used in the receive mode. The input signal is normally weak (a few millivolts) and noisy. The DC level of the input signal is normally not very well defined. Analog processor 22 amplifies the AC (varying) portion of the signal and performs a limited amount of noise filtering on it. It eventually monitors the signal for transitions from a "low" state to a "high" state and generates a corresponding well-defined, digital output.

FIG. 3 is a drawing illustrating analog processor block 22. Analog processor 22 includes a number of high-pass filters 1221, a first comparator 1222, a low-pass filter 1223 and a second comparator 1224 with hysteresis. High-pass filters 1221 are used to reject the (fixed) DC level of the input signal, while amplifying the AC portion. A total AC gain of about 100 is enough to boost milli-volt range signals to a level practical for further processing. High-pass filters 1221 may be implemented by switched-capacitor technology and the clock rate of filters 1221 may be variable as set by clock oscillator 26, whose frequency is determined by an external capacitor and resistor, as explained with more particularity below. As a result, the filter cut-off frequency will automatically adjust to the (user-defined) sampling rate. For improved supply rejection performance (immunity to noise introduced by the digital portion of the IC), the high-pass filters are preferably implemented in fully-differential technology.

In FIG. 3, high-pass filters 1221 are followed by a comparator 1222, whose digital output is logic high when filter output 1221 is negative and logic low when filter 1221 output is positive. First comparator 1221 is followed by a continuous-time low-pass filter 1223 and a second comparator 1224. Comparator 1224 has a certain amount of input hysteresis to effectively reject short (high-frequency) digital noise spikes. The output of analog processor 22 is a clean digital data stream, which ideally should match the data stream generated by the transmitter IC.

Figure 3A:
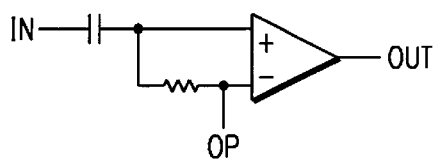
FIG. 3a is a schematic diagram of a first embodiment of high pass filter 1221 of FIG. 2.

FIG. 3a is a first embodiment of a high pass filter 1221 providing AC coupling. Compared with prior art FIGS. 14 and 15, one can verify that the traditional method corresponds to a DC-coupled system. If the comparator is modeled as a linear, high-gain amplifier (with gain A) and it is assumed that the low-pass filter is a first-order system, a simple formula can be written for the comparator output, Y, as a function of the input signal, X:

$$Y=A(X-X/(1+jf))=AX(1-1/(1+jf))$$

$$Y=AX(jf/(1+jf))$$

Where f is the first-order pole of the low-pass filter and j is the imaginary unit. Inspection of the second formula reveals a high-pass filter characteristic. This means that the traditional circuit of prior art FIGS. 14 and 15 can be replaced by a high-pass filter configuration as shown in FIG. 3a, without functionality change. This high-pass filter approach has the following advantages:

1. It is AC-coupled, i.e. the DC level (operating point) of the incoming signal is irrelevant, because the signal is passed through a capacitor.
2. The operating point (OP) can be chosen arbitrarily, as long as it is within the input common-mode range of the amplifier.

While the first embodiment of high pass filter 1221 of FIG. 3a is a significant improvement over prior art FIGS. 14 and 15, an offset problem may still exists. The sensitivity of the signal shaper is still limited by the comparator offset. In order to increase the sensitivity, one or more pre-amplifiers are needed. However, the amplifiers can all be AC-coupled in a fashion similar to the comparator as a comparator and an amplifier with differential input are very similar anyway. This scheme will solve the offset problem completely. The input-referred offset of one stage simply results in an operating point variation at the output, which is rejected by the high-pass (AC-coupled) characteristic of the next stage.

Figure 3B:
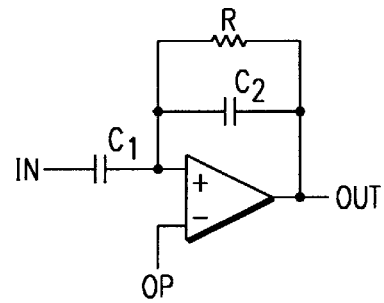
FIG. 3b is a schematic diagram of a second embodiment of high pass filter 1221 of FIG. 2.

FIG. 3b shows a second embodiment of high pass filter 1221 of FIG. 3 having switched-capacitor stages illustrating a practical implementation of an AC-coupled gain stage. The amplifier is assumed to have very large ("infinite") gain. The closed-loop high-frequency gain is set by the ratio of C1 and C2. The DC gain is 0. The time constant (inverse of cut-off frequency) is set by the product of R and C2.

While providing a further improvement, the realization of FIG. 3b may be impractical for implementation within an integrated circuit, because of the very long time constants that are typically needed (millisecond range). In practical systems, the bit-rate is limited to a few kHz, and the time constant must typically be longer than one bit time, as shown above. Such long time constants cannot economically be realized with on-chip resistors and capacitors. Implementation with external capacitors and/or resistors is feasible, but puts more burden (and cost) on the final user.

Figure 3C:
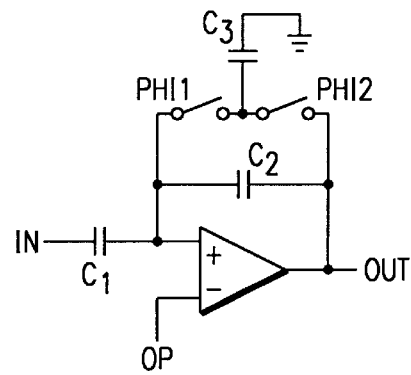
FIG. 3c is a schematic diagram of a third embodiment of high pass filter 1221 of FIG. 2.

However, as illustrated in the third embodiment of FIG. 3c, the resistor can be replaced by an equivalent switched-capacitor network, where according to the well-known formula:

$$Req=1/(C3 fs)$$

Where fs is the switching frequency and PHI1 and PHI2 are non-overlapping clocks as explained with reference to FIGS. 4 and 5a.

Therefore, the cut-off frequency, fc for the high-pass filter is:

$$fc=(C3/C2)fs$$

The switched-capacitor approach works well as long as the switching frequency (which is normally also the sampling frequency for the incoming signal) is faster than the bit rate. The high pass filter 1221 implementation of FIG. 3c has the following advantages:

1. Long time constants can be realized on-chip.
2. The system is still AC-coupled and self-biasing.
3. The cut-off frequency is set by a ratio of capacitors, which can be matched very well on an integrated circuit.
4. When the sampling rate, fs, is changed (normally because of different expected bit-rate), the cut-off frequency, fc, changes proportionally. This simplifies the use of the signal shaper, since no new calculations or different external components are needed.

Figure 3D:
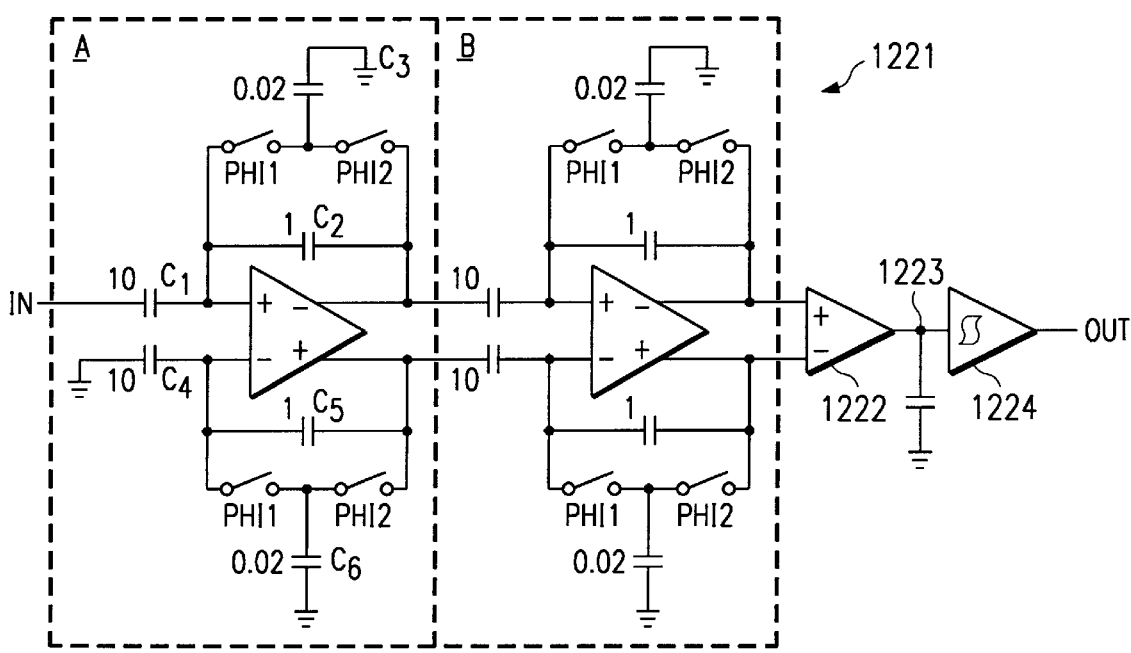
FIG. 3d is a schematic diagram of a preferred embodiment of high pass filter 1221 of FIG. 2.

FIG. 3d shows the fully-differential architecture preferred embodiment of high pass filter 1221. It consists of two similarly constructed gain stages A and B with a nominal gain of about 10 and time constants of about 50 sample periods (sampling at about 10× the expected bit rate is assumed). The second gain stage B is followed by the comparator 1222. The gain stages are implemented in a balanced, fully-differential fashion. Such architecture tends to improve power supply rejection and immunity to parasitic effects. The amplifiers are designed in such a way that their common mode operating point is stabilized. Capacitor C1 in the input capacitor that couples the input signal into the amplifier. Filter 1221 thus is fully differentiated as the input signal passes through a capacitor as it enters the gain stage. In the preferred embodiment, it is sized at about 10 picofarads. Capacitor C2 is connected in feedback fashion to set the gain. In the preferred embodiment, it is sized at about 1 picofarad. Capacitor C3 is connected on one side to a power supply of about 5 volts in the preferred embodiment. The other side of capacitor C3 is connected to switching signals PHI1 and PHI2. Capacitor C3 sets the time constant and sets the operating point of the fully differentiated operational amplifier. One side of input capacitor C4 is connected to ground as is one side of capacitor C6. Capacitors C4, C5, and C6 are sized identically to capacitors C1, C2, and C3.

The comparator 1222 thus has a differential input provided by gain stages A and B and single-ended output. It provides a first approximation of the incoming digital signal. Additional capacitance 1223 is added at the output of comparator 1222 in order to limit its high-frequency response. This limits the rate of change of the output signal. The schmitt-trigger 1224 (buffer with hysteresis) restores the signal to full logic levels. And, the combination of comparator and schmitt trigger eliminates very fast noise spikes, which could otherwise be sampled and misinterpreted.

Continuing with FIG. 2, synchronizer/counter 24 samples the output from analog processor 22 (which output signal has digital levels but is still continuous-time) at the rate of the sample clock, which in this case is the output of clock oscillator 26. It filters the resulting discrete-time signal and then determines (counts) the relative high and low times of that signal to allow for decoding by main processing unit 30. The filter used in this embodiment is a window filter X4 illustrated in FIG. 4 with a width of three and a simple majority voting scheme. This filter effectively eliminates any isolated (i.e. one sample long) noise spikes, should they have made it through analog processor 22. The counter portion of block 24 interfaces to MPU 30 by the signals rising edge "RE", falling edge "FE" and rising clock "RC" that are explained with more particularity with reference to FIGS. 4 and 5a. As shown in the schematic of FIG. 4, it consists of an 8-bit counter which is incremented on each sampling clock cycle, and some logic to detect a rising or a falling edge of the incoming serial data stream. While a more detailed explanation follows with reference to FIG. 4, in general, the counter is read by MPU 30 on each rising edge, and then reset. On each falling edge, the counter is read again (but not reset). This reading yields the "high" time of an incoming pulse, L1 as shown in FIG. 5. The next reading (on the next rising edge) yields the total pulse width, L. The values of L1 and L are used by a decoding algorithm to extract the transmitted data from the serial stream as will be later explained with reference to FIG. 9. A reset counter output feeds into I/O interface 38, which in turn is mapped in the memory address space. The signals that indicate rising or falling edges ("RE" and "FE" respectively) are connected directly into main processing unit 30.

Figure 4:
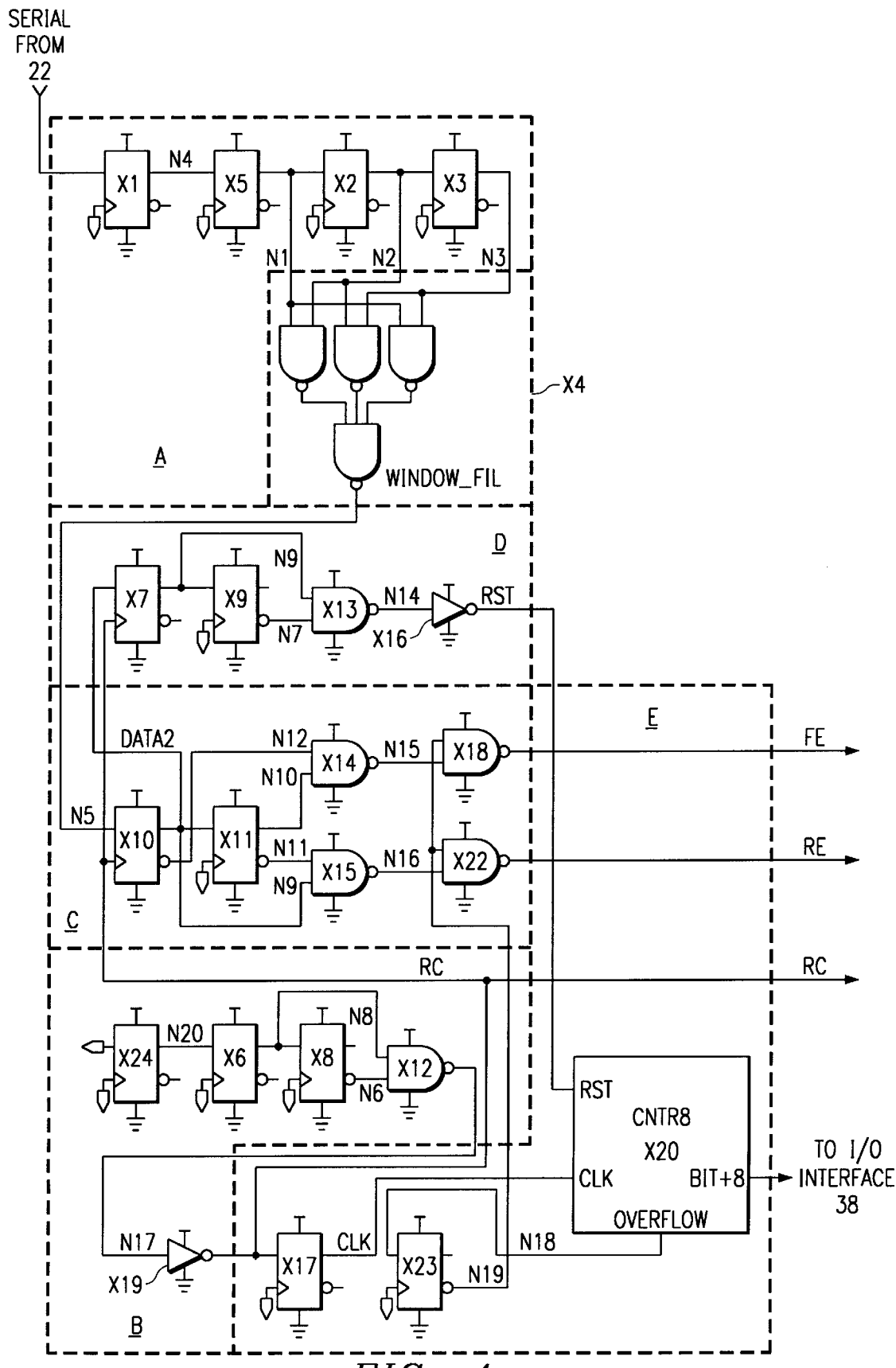
FIG. 4 is a schematic diagram of the synchronizer/counter 24 of FIG. 2.
Figure 5:
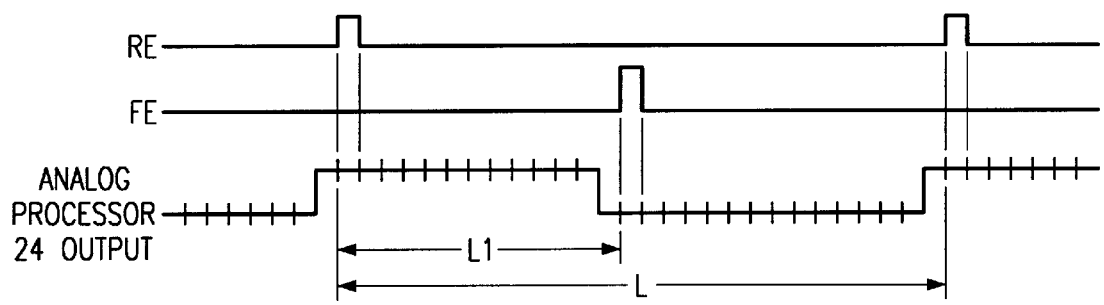
FIG. 5 is a timing diagram illustrating data sampling.
Figure 5A:
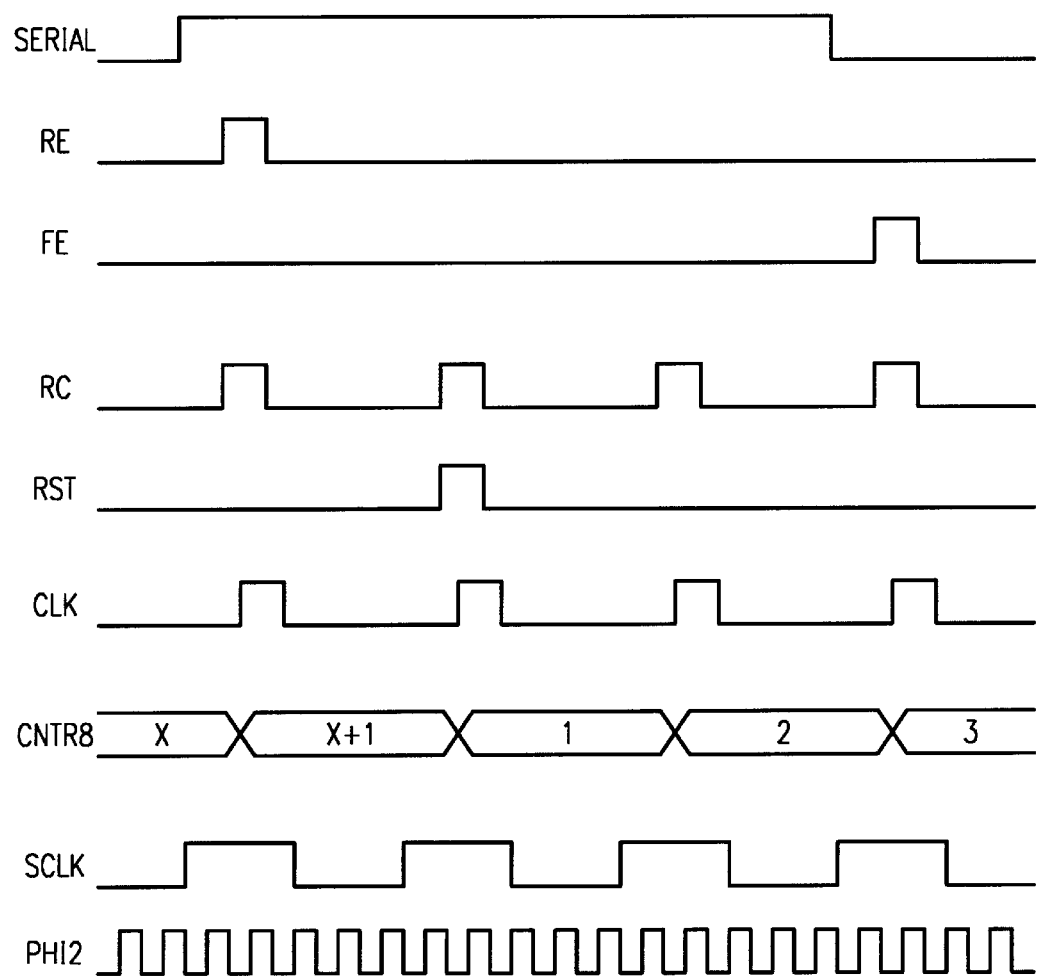
FIG. 5a is a timing diagram for the schematic of FIG. 4.

Attention is now directed to FIG. 4 which is an electrical schematic diagram of synchronizer counter 24 of FIG. 2 and to FIG. 5a which is a timing diagram illustrating the operation of FIG. 4. As will be described below, the system is designed to help a micro-controller or micro-processor (the "controller") decode a serial digital data stream like the one typically used in serial interfaces (e.g. RS-232 standard) or for remote control applications over an RF link. It measures the pulse widths of the logic high and the logic low parts of the incoming serial signal (SERIAL). It uses a binary counter, and signals to the controller when a rising or falling edge occurs (RE, FE).

The circuit of FIG. 4 uses two clocks to achieve synchronization. The first clock is the sample clock (SCLK) generated by clock oscillator 26 which sets the rate at which the serial data signal SERIAL is read. Each rising edge of SCLK results in a sample of SERIAL being taken. The second clock is the master clock generated by clock oscillator 27 used by controller 30 itself. Typically, this clock is much faster than SCLK (1.5 MHz vs. 50 kHz in the preferred embodiment), because the controller must be fast enough to process (i.e. decode) the serial information in a real-time fashion. At least two non-overlapping phases are needed; in this application, they are named PHI1 and PHI2.

All flip-flops in the electrical schematic of FIG. 4 are edge-triggered D types. The various circuit portions are next described.

Section A of FIG. 4 samples, synchronizes and filters the incoming signal. Flip-flop X1 is used to synchronize the incoming data (on "SERIAL") to the sampling clock, SCLK. The three additional flip-flops, X5, X2, X3, form a 3-stage delay line, which in conjunction with decoding logic X4 forms a 3-stage majority voting scheme (also referred to as a window filter). Whenever two or more outputs from the delay line are high, the output of the filter is high. Whenever two or more outputs from the delay line are low, the filter output is low. This filter is used to ignore the effect of isolated noise spikes in the serial data stream, which may corrupt the logic value of one sample, without changing the sample immediately preceding or immediately following it. Since the incoming signal goes through two flip-flops (X1 and X5) before undergoing any modification, very reliable sampling and synchronization is obtained. This is because the probability of a meta-stability decreases rapidly with the number of consecutive flip-flops used for sampling. Node N5 carries the sampled and filtered input signal.

Section B of FIG. 4 detects rising edges of the sampling clock. Flip-flop X24 and X6 are used to sample SCLK, using the faster master clock PHI1. Since two consecutive flip-flops are used, the probability of meta-stability is drastically reduced and reliable synchronization is obtained. The purpose of re-sampling SCLK is to provide a signal, RC ("Rising Clock"), that indicates when a rising edge of SCLK occurs. This indication signal is synchronized to the master clock (PHI2), and is such that when a rising edge is detected, a pulse is generated that is exactly one period of PHI2 long. The edge-detect circuitry is implemented by flip-flop X8 and AND gate X12/X19. The output signal, RC, will be high if and only if the input to X8 is high and the output is low. This situation is equivalent to the present sampled value being high and the previous sampled value being low. The RC pulse always occurs between 1 and 2 PHI2 periods after the actual transition on SCLK. (The transition itself is asynchronous).

Section C of FIG. 4 detects rising and falling edges on the filtered version of SERIAL. The sampled and filtered input signal, N5, is synchronized to SCLK, but not to the master clock, PHI2. Therefore, a second synchronization is needed. Flip-flop X10 provides this synchronization. It is clocked by the RC signal (which is generated by section B and is synchronous to PHI2) and generates a PHI2-synchronous signal, DATA2. This resampling can be achieved by a single flip-flop, since meta-stability is not an issue. Indeed, N5 only changes on rising edges of SCLK, and RC is a pulse with rising edge occurring between 1 and 2 PHI2 periods after the rising edge of SCLK, which always results in ample set-up time for flip-flop X10.

Continuing with section C of FIG. 4, flip-flop X1, together with NAND gates X14 and X18, form a falling edge detector. X11 is clocked by PHI2; this is compatible with X10 being clocked by RC, since the two signals are synchronous, and a rising edge on PHI2 always occurs before a rising edge on RC. The output of this falling edge detector, FE, is always exactly one period of PHI2 long. During normal operation, signal N19 (second input of X18) is high, which makes X18 operate as an inverter. One can verify that FE goes high when the input of X1 is low and the output is high (current value high, previous value low). Similarly, flip-flop X11, together with NAND gates X15 and X22, form a rising edge detector. The output signal, RE, is synchronous with PHI2 and always exactly one period long.

Section D of FIG. 4 generates counter reset signals. A counter needs to be reset after each detected rising edge (pulse on RE). The counter reset signal, RST, must occur one SCLK time after the RE pulse. This is accomplished by section D. The re-synchronized version of the serial signal, DATA2, is sampled by flip-flop X7, which is also clocked by RC (just like X10). This results in a delay of one period of RC. The delayed signal then goes to a rising edge detect circuit formed by flip-flop X9 (clocked by PHI2) and AND gate X13/X16. The resulting signal, RST is synchronous with PHI2 and exactly one period of PHI2 long. The RST pulse always occurs (approximately) one SCLK period after a RE pulse.

Section E of FIG. 4 measures pulse widths. As shown above, a short time after each rising edge of SCLC, an RC pulse is generated, which is synchronous with PHI2. This pulse is used to clock a counter, in this case an 8-bit binary type, called CNTR8. The result is that the counter value is incremented on each rising edge of SCLK. In other words: the counter continuously counts the number of samples taken of the SERIAL signal.

Flip-flop X17 of section E or FIG. 4 re-samples the RC signal, using PHI1. The result is that the counter clock is delayed by one clock phase with respect to PHI2. This is necessary in order to use a synchronous counter with reset. The RST signal coming out of section D is synchronous with PHI2 (but slightly delayed) and could not go into a counter which would itself be clocked by a signal that is slightly delayed with respect to PHI2. The additional one-phase delay on the counter clock ensures a proper set-up time for the RST signal. The design of the counter is such that when RST is high, and a rising edge occurs on the CLK input, the counter is reset to a numeric value of 1. This will result in a correct value being read for low and high times, as described below.

In the preferred embodiment, the counter is an 8-bit synchronous counter with reset and has an overflow output, which becomes logic high whenever the count reaches 255. This overflow is resynchronized to PHI2 and used to force FE and RE high when the counter exceeds its range. This is desirable in a case where SERIAL would be inactive (either low or high) for a long time, since in such case, no edges would be detected, and the controller could be stuck in a software loop waiting for RE or FE.

The overall method used to decode the incoming pulse-width modulated digital serial pulse stream, is next described as follows:

1. The serial data is sampled by SCLK and synchronized to PHI2, as described above.
2. A 0 to 1 (rising edge) on the serial data generates an RE signal.
3. One SCLK period later, the counter is reset to a value of 1.
4. A 1 to 0 (falling edge) on the serial data generates an FE signal.
5. The controller reacts by reading the value of the counter (within one SCLK time). This value expresses the high time of the current pulse (L1).
6. A 0 to 1 (rising edge) on the serial data generates an RE signal.
7. The controller reacts by reading the value of the counter (within one CLK time). This value expresses the total time (pulse width) of the current pulse (L).
8. One SCLK period later, the counter is reset to a value of 1 Meanwhile, the controller analyzes the received pulse by comparing L1 and L. (Obviously, the low time could be calculated as L0=L−L1.)

Steps 4 through 8 are repeated continuously in order to decode the incoming serial data stream and extract the transmitted information real-time. The controller can efficiently do this, since it does not have to wait and analyze each incoming sample on SERIAL. Instead, the counting of pulses is accomplished by this decode circuit. The controller can focus on the decoding operation, by comparing relative high and low times.

This scheme makes it possible to execute a relatively sophisticated decoding algorithm on a simple controller, since the decode section takes away a great part of the processing burden. By making the controller wait for the RE and FE signals during the execution of the decoding algorithm, effective synchronization between the decode circuit and the controller is guaranteed, even if the controller does not have interrupt capabilities.

Referring back now to FIG. 2, clock oscillator 26 controls the rate of serial data transfer. In the transmit mode, it sets the bit rate of the transmitted serial data stream. In the receive mode, it sets the rate at which the incoming data stream is sampled. Oscillator 26 is of the relaxation type and uses one external resistor and one external transistor to set the frequency preferably between about 5 Khz and 50 Khz.

In FIG. 2, MPU oscillator 27 is fixed in frequency and controls the rate at which MPU 30 executes its program. Nominally, MPU 30 executes about 1 million instruction cycles per second. The output data (serial data stream) coming out of an IC 20 configured as a transmitter will be synchronized with the externally adjustable clock. MPU oscillator 27 produces the serial data at the required bit rate, based on the external clock. Information about the external clock is provided to the MPU 30 through the "RC" (rising clock edge) signal, which is generated by synchronization/ counter block 24. However, the serial data from MPU 30 must still be synchronized with clock oscillator 26. Data flip-flop 28, clocked off the clock oscillator 26 and placed between I/O interface 38 and the serial output pins 8–11 achieves the final synchronization.

MPU 30 of FIG. 2 is illustrated in block diagram form in FIG. 6. As the discussion below reveals, the MPU core architecture 30 is extremely simple, resulting in minimal hardware, yet it allows the implementation of very powerful logic or arithmetic functions. It is very compact, occupying only about 1000–1500 square mils of semiconductor die area, excluding memory. It may be manufactured by existing 1 micron double-metal CMOS technology such as the PRISM process practiced by Texas Instruments Incorporated.

In FIG. 6, MPU 30 has an 8-bit wide data bus 1301 and a 12-bit wide address bus 1302. This makes it possible to access up to 4096 8-bit wide memory locations (ROM 32, RAM 34, EEPROM 36 or I/O 38) in a Von Neumann type architecture. Since MPU 30 is intended for small, embedded controller applications, such limited memory space is adequate. An advantage of a 12-bit wide address bus 1302 is reduced hardware, compared to the more common case of a 16-bit wide address bus. All registers or logic blocks that operate on an address (program counter, incrementer, address register . . . ) are reduced in size.

The instruction set for MPU 30 of FIG. 6 is contained in Appendix 1 pages 1–6. The instruction set is very limited instruction set (22 instructions) and thus MPU 30 is of the reduced instruction set (RISC) type. The instructions perform the following functions:

Arithmetic and logic (7 instructions):
add, subtract, logic AND, logic OR, exclusive OR, shift right with carry, shift left with carry.
Mnemonics: ADD, SUB, AND, ORL, XOR, SHR, SHL
Register transfer (1 instruction):
Load B register from accumulator.
Mnemonic: LBA
Carry bit manipulation (2 instructions):
set carry and clear carry.
Mnemonics: STC, CLC
Jumps (3 instructions):
Absolute jump, absolute jump when carry set, absolute jump when carry not set.
Mnemonics: JMP, JPC, JNC
Memory access (5 instructions):
load accumulator immediate, load accumulator direct, store accumulator direct, load accumulator indirect, store accumulator indirect.
Mnemonics: LAV, LDA, STA, LAI, SAI The instructions provided above are sufficient to perform any kind of logic or arithmetic task anticipated task in the field of remote access.

In addition, 4 instructions allow house-keeping tasks to be performed in a simple manner:
stop (and go to low-power stand-by mode), wait for rising data edge, wait for falling data edge, wait for rising clock edge. Mnemonics: STP, WRE, WFE, WRC
STP halts execution of the program and puts MPU 30 in a low-power stand-by mode, from which it can be pulled again by an external logic signal. The STP instruction causes a flip-flop to be set, which freezes the MPU clock in a given state, until the flip-flop is reset by an external event (in this application, activation of a switch by a user).

WRE, WFE and WRC are instructions very specific to this embodiment. They place MPU 30 in a wait state until a specific event occurs (rising or falling edge in this case). These instructions are only used to synchronize MPU 30 during the decoding of a serial data stream, which is based on an externally supplied, unrelated clock.

While subroutine calls and returns are not supported in the preferred embodiment, they may be easily added.

The instruction set above together with the reduced 12 bit side address bus 1302, allows a lot of flexibility in the choice of op-codes (binary values corresponding to each instruction). In this particular embodiment, the op-codes (8 bits long) were chosen so that the instructions requiring a memory reference (an address) could be distinguished from each other using only 4 bits. The 4 other bits are used as the high part of the address. The low part of the address is then coded in the next byte. This scheme utilizes the available ROM storage space more efficiently than if an opcode were followed by two bytes for memory reference. The approach taken results in smaller programs that also execute faster when given a fixed MPU clock rate.

Referring again to FIG. 6, MPU 40 has a very limited set of registers. All transfers to and from the memory are performed through the 8-bit accumulator or A register 1303. All single-operand arithmetic or logic functions (e.g. SHL) are performed on A. A single condition or carry bit (C) 1304 is used for indication of logic or arithmetic overflow, negative numbers (two's complement operations), shift output bits etc. The state of this one bit is used as a qualifier for conditional jumps. Two-operand logic or arithmetic operations (e.g. add, AND) are performed between A register 1303 and a second 8-bit register, B 1305. B register 1305 can only be written to through the LBA command.

In FIG. 6, an 8-bit instruction register (IR) 1306 is used to download instructions from memory and decode them. This register can only be written to/from memory, during an instruction fetch cycle. A 4-bit address register high (ARH) 1307 is used to temporarily store the high part of a memory address. The associated address register low (ARL) 1308 is used to temporarily store the lower 8 bits of an address. The program counter (PC) 1309 is 12 bits wide and points to the next byte to be downloaded from the memory during program execution.

In FIG. 6, a slave register (SVARS) 1324 holds 2 state variables which are used for composite instructions. An Instruction Program Logic Array (IPLA) 1313, which is clocked in nature, acts as the master register. A master register CARRY 1325 and a slave register C1 1326 exist for condition (carry) bit 1304. General reset, set and clear capability are provided. An arithmetic logic unit register ALU1 1327 is a slave register for A register 1303 and B register 1305 (through ALU 1310, which is combinational). This allows the result of an ALU operation to be returned to A register 1303. In this "circular" mode, register ALU1 1327 reads data on a clock cycle phi3, while A reads data on a clock cycle phi1.

Still with reference to FIG. 6, a register LATCH3 1328 delays the three lines from instruction register 1306 that select the ALU operation (IR(3,5)). This is because the pipelining of MPU 30 is such that while an instruction is down-loaded from memory, the ALU 1310 operation of the previous instruction may still be going on. A register INC1 1329 is a slave register for program counter PC 1309 (through INC 1323, which is combinational). This allows the result of a program counter increment to be returned into PC 1309. An indirect addressing block IND_ADD 1318 is a logic block (not a register) used to force an indirect address on address bus (BBUS) 1317, when enabled. The input to block IND_AD 1318 comes from instruction register 1306 with four bits IR (0,3). These 4 bits (part of an instruction) select one out of 16 possible locations in the main memory, to be used as an indirect address location for the LAI and SAI instructions. Each one of those 16 locations consists of 2 bytes (since they need to hold a 12-bit actual address). A RESET block 1324 is used to force CBUS 1319 to 0 (initial execution address) during initialization when a RESET signal is enabled. RESET block 1324 is implemented as a bank of N-channel MOS transistors.

In FIG. 6, the 8-bit ALU 1310 allows for 7 different arithmetic operations, involving either only A register 1303, or A register 1303 and B register 1305, as well as the condition bit 1311. The select input 1312 of ALU 1310 consists of 3 lines, which come straight from Instruction Register 1306 and determine which operation needs to be performed. The Instruction Program Logic Array (IPLA) 1313 is used to decode the current instruction in IR 1306. Its inputs also include two lines that represent state variables, for the execution of composite instructions, three external lines for synchronization of the program flow (RE, FE, RC) and a reset line. The outputs of IPLA 1313 control the whole data flow between registers and building block of MPU 30. IPLA 1313 is implemented as an AND-OR PLA with dynamic (pre-charged) outputs. Appendix 2, pages 1–3 contains an extended listing of IPLA 1313 while appendix 3 page 1 contains a simplified listing.

Still referring to FIG. 6, in addition to 8-bit data bus 1301 and 12-bit address bus 1301, there are three separate, internal buses. The first bus, ABUS 1314, is 8 bits wide and allows the exchange of data between data bus 1301, and registers 1303, 1305, and 1306. It also allows the output from ALU 1310 to be fed back to register 1303. Downloading of data from data bus 1301 to address registers 1307 and 1308 happens through ABUS 1314 as well. ABUS 1314 is isolated from data bus 1301 through two buffer blocks: INBUF 1315 and OUTBUF 1316. This allows internal registers to have a smaller drive strength than if they had been connected directly to data bus 1301. The second bus, BBUS 1317 is 12 bits wide and interfaces directly to external address bus 1302. BBUS 1317 allows for the exchange of data between the output of ARH 1307 and ARL 1308 (collectively also called address register or AR), and an indirect address register IND_AD 1318. In some cases, BBUS 1317 can be shorted to the third bus, CBUS 1319. CBUS 1319 is also 12 bits wide and is primarily used to carry the incremented value of program counter PC 1309 back into PC 1309. In some cases, it can be shorted to BBUS 1317 (when the switch BC_SW 1320 is closed).

In FIG. 6, A register 1303 and B register 1305 are single-port registers with a separate output. Both registers can read from ABUS 1314 or write to ABUS 1314, depending on whether enable in ENIN 1321 or enable out ENOUT 1322 is activated. The output is always enabled, irrespective of ENIN or ENOUT. Instruction register IR 1306 is similar to registers 1303 and 1305, except that the ENOUT control input is permanently disabled (there is no need for IR 1306 to write to ABUS 1314). Address registers ARH 1307 and ARL 1308 are dual-port registers. When signal ENIN 1321 is enabled, data is loaded into the appropriate register from ABUS 1314. When signal ENOUT 1322 is enabled, the appropriate output is written onto BBUS 1317. When ENOUT 1322 is inactive, the output in question is high-impedance.

Continuing a discussion of FIG. 6, BC_SW 1320 is implemented as a simple, bi-directional CMOS switch, which is closed when the EN signal is high. PC 1309 is a single-port register with separate output, of the same type as A register 1303 and B register 1305. Incrementer INC 1323 is a simple combinational logic block (incrementer built with half-adders and a ripple carry).

In FIG. 6, ALU 1310 is a simple combinational logic block. The add and subtract functions are performed with full adders and a carry ripple scheme. Multiplexers are used to select between the outputs of add/subtract or the other functions (AND OR . . . ). IPLA 1313 is implemented as an AND-OR array with pre-charge on clock phase phi3 and evaluation on clock phase phi1. The outputs from the array (the actual PLA) are gated using separate logic gates with either clock signals phi1 or phi2 to generate the control signals that are to be active on those respective phases only. Signals that are to be active on clock phase phi3 are lathed on phi2 and then gated with phi3. INC 1323 is a simple combinational logic block (incrementer built with half-adders and a ripple carry).

In FIG. 6, IND_AD 1318 calculates an indirect address from instruction register 1316 bits IR(0,3) by shifting the 4 bits one position to the left (this yields bits 1 through 4 of BBUS 1317), pulling bits 5 through 10 of ABUS 1314 low and bit 11 high. Bit 0 is held high when the first address location is accessed, low for the second one. The result is that the indirect address locations are mapped at memory addresses 800 through 81F (hex), which in this implementation is RAM 34.

In FIG. 6, ALU1 1327, INC1 1329, SVARS 1324, CARRY 1325 and C1 1326 are implemented as standard (two-port) latches. INBUF 1315, OUTBUF 1316 and ADBUF 1330, although simple buffers only intended to boost drive capability, are actually implemented as full static registers (latches). This is to avoid the possibility of floating nodes during the power-down condition.

Discussion is now directed to the clocking scheme used for MPU 30 of FIG. 6. The clocking scheme relies on three non-overlapping clock phases: phi1, phi2 and phi3 produced by MPU clock 27. Phi1 is the evaluation phase for the (dynamic) IPLA 1313. Also on phi1, addresses are updated and placed on the address bus 1302. Phi2 is when all transfers to and from memory take place. The READ and WRITE signals are active during phi2. All inputs to IPLA 1313 change state on phi2. Phi3 is the pre-charge phase of dynamic IPLA 1313. Normally, no operations take place on phi3. One main exception is the case of an arithmetic or logic operation: the result is transferred from the ALU 1310 output back to A register 1303 during phi3. One advantage of the three-phase clocking scheme is that elementary instructions can be performed in one clock cycle (three phases). Also, the scheme is such that exactly one memory access occurs on each cycle. Since memory access is the slowest operation in this processor core, maximum speed advantage is gained. In addition, a three-phase scheme is ideally suited for access of most common memories (ROM 32, RAM 34 . . . ). During phi1, the memory address is presented. The whole phase allows the address buses and decoders within the memory to stabilize. Phi1 may also allow a pre-charge of memory bit lines. During phi2, the READ or WRITE signal is made active and the actual memory access occurs. Phase three ensures that address bus 1302 remains stable while the READ or WRITE signal is removed. The scheme ensures that no glitching or spurious memory access can occur.

Returning now the discussion of FIG. 2, ROM 1322 contains the executable program and the constant data used by MPU 30. The size of this program is about 1500 memory Bytes. RAM 34 of FIG. 2 holds temporary data generated during the execution of MPU 30's program. Examples are variables, counter values etc. RAM 34 contains 32 memory bytes. EEPROM 36 of FIG. 2 holds non-volatile temporary data generated during the execution of MPU 30's program. EEPROM 36 can be read directly by MPU 30. However, writing is a two-step operation. Volatile data (disappears when power is removed) is made permanent through the application of a high programming voltage (typically 16 V). This voltage is generated by an on-chip charge pump. EEPROM 36 contains about 24 EEPROM bytes and is primarily used to store 4 identification codes (5 bytes each and their check sums), as well as other variables and flags (e.g. for transmitter-lock).

MPU 30, ROM 32, RAM 34 and EEPROM 36 of FIG. 2 comprise a microcontroller 40 for IC 20 which advantageously provides the following functions:

Decoding of incoming serial data stream (receive and learn modes);

Comparison of incoming identification code with stored codes receive mode);

Activation of output pins (receive mode);

Polling and debouncing of parallel inputs (transmit mode);

Parallel to serial conversion (transmit mode);

Encoding of outgoing serial data stream (transmit mode);

Maintenance of EEPROM memory data;

Control and timing of charge pump for EEPROM memory;

Encryption and decryption, associated with a rolling code feature;

Various self-tests on ROM, RAM, EEPROM etc.; and

Various housekeeping tasks (activation and timing of LED . . . ).

Figure 7:
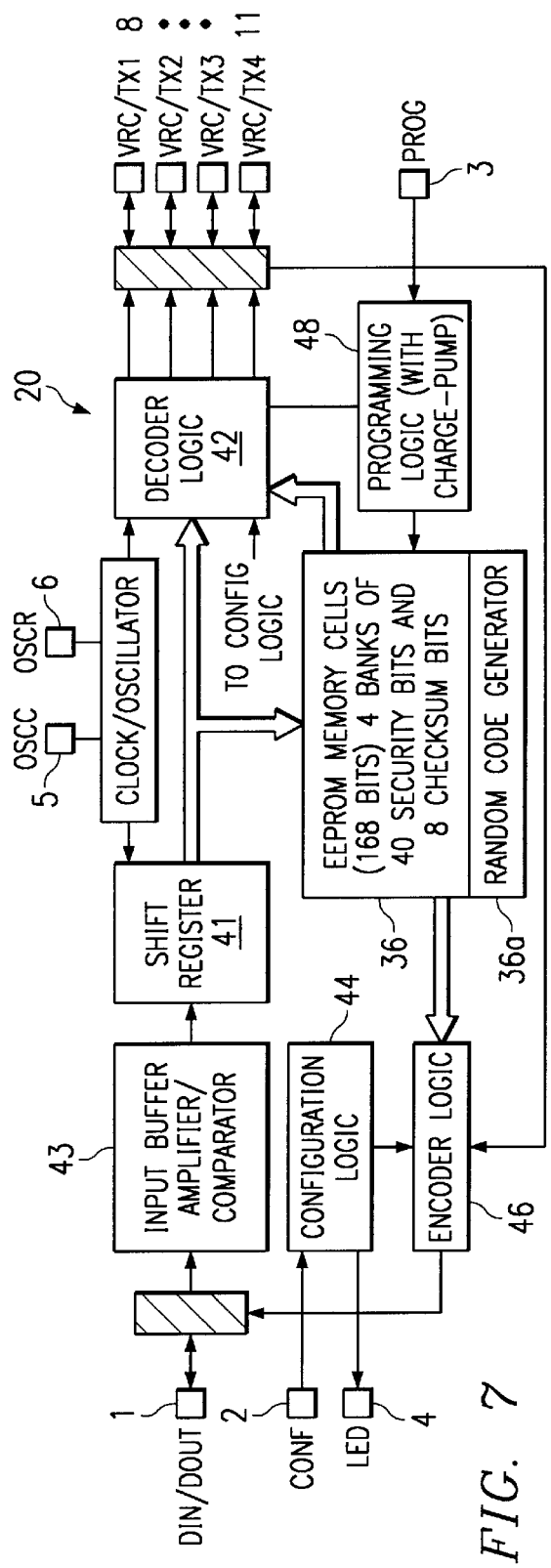
FIG. 7 is a functional block diagram of IC 20 of FIG. 2.

FIG. 7 illustrates a functional block diagram of IC 20. Functionally, a shift register 41 converts the incoming serial data bits to a parallel format. Decoder logic 42 is used in the receive mode to convert received symbols, later explained, to a 40 bit pattern that can be compared with four 40-bit codes stored in EEPROM 36. When a match is found with the stored code, the appropriate output pin (VRC/TX1–4) will be active for the entire time valid code is received. Configuration logic 44 configure IC 20 as either a transmitter or receiver. Both the encoder logic 46 and the decoder logic 42 as well as the bi-directional I/O ports are controlled by configuration logic 44. Encoder logic 46 uses parallel data from EEPROM 36 and encodes the selected security code for transmission to DIN/DOUT pin 1. The pre-code and security code symbol sequences are generated in encoder 46, as well as the channel identifier code. Transmission is enabled by a logic transition (to a low state) on one or more of the four input pins VRC/TX8–11. EEPROM 36 stores the four banks of 40 bit security codes (40 bits for each learned transmitter). EEPROM 36 functionally also contains random code generation logic 36a, which can be used to generate random code for IC 20 configured as a transmitter. Programming logic 48 generates the programming pulse (using an internal charge-pump) required to program EEPROM 36 after the code has been loaded into the memory cells (via a parallel bus) from the shift resister 41. Timing for the specific programming pulse ramping voltage is derived from an internal fixed clock.

Figure 8:
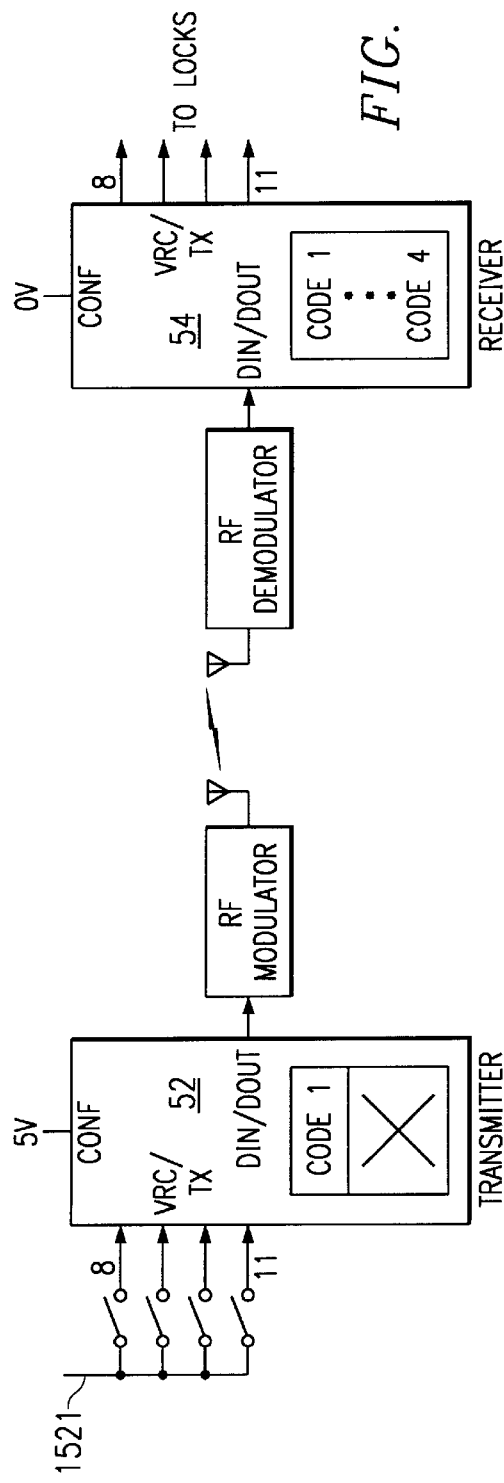
FIG. 8 is a diagram illustrating an IC 20 configured as a transmitter and another IC 20 configured as a receiver in a data transmission system.

FIG. 8 illustrates a data system 50 employing IC 20. IC 20 is configured as a transmitter 52 by connecting CONF pin 2 to Vcc while IC 20 is configured as a receiver 54 by connecting CONF pin 2 to ground. Data system 50 is exemplary of a garage door opening system. Transmitter 52 will be housed in a remote control situated in an automobile, for example, while receiver 54 will be connected to the garage door opener. Data system 50 is also exemplary of an automobile security system wherein transmitter 50 may be housed in a key and receiver 50 may be connected to automobile door locks. Switches 521 will connect to VRC/TX pins 8–11 of transmitter 52 and activate transmitter 52 when pressed while VRC/TX pins of receiver 54 will be connected to door locks, for example. Communication between transmitter 52 and receiver 54 is accomplished by connecting DIN/DOUT pins 1 to a radio frequency modulator and to a radio frequency demodulator.

In FIG. 8, pins 8–11 of transmitter 52 are inputs. Transmitter 52 reads those inputs and anchors the data into a serial format and brings it out to pin 1 where it is transmitted to receiver 54. Since CONF pin 2 of receiver 54 is grounded, receiver 54 is configured to receive the serial transmitted data. The serial transmitted data from transmitter 52 is input into receiver 54 through DIN/DOUT pin 1 of receiver 54. VRC/TX pins 8–11 of receiver 54 function as output pins. Hence, the same pins of IC 20 may be used as a transmitter or as a receiver by reversing the direction according to the configuration.

Figure 12:
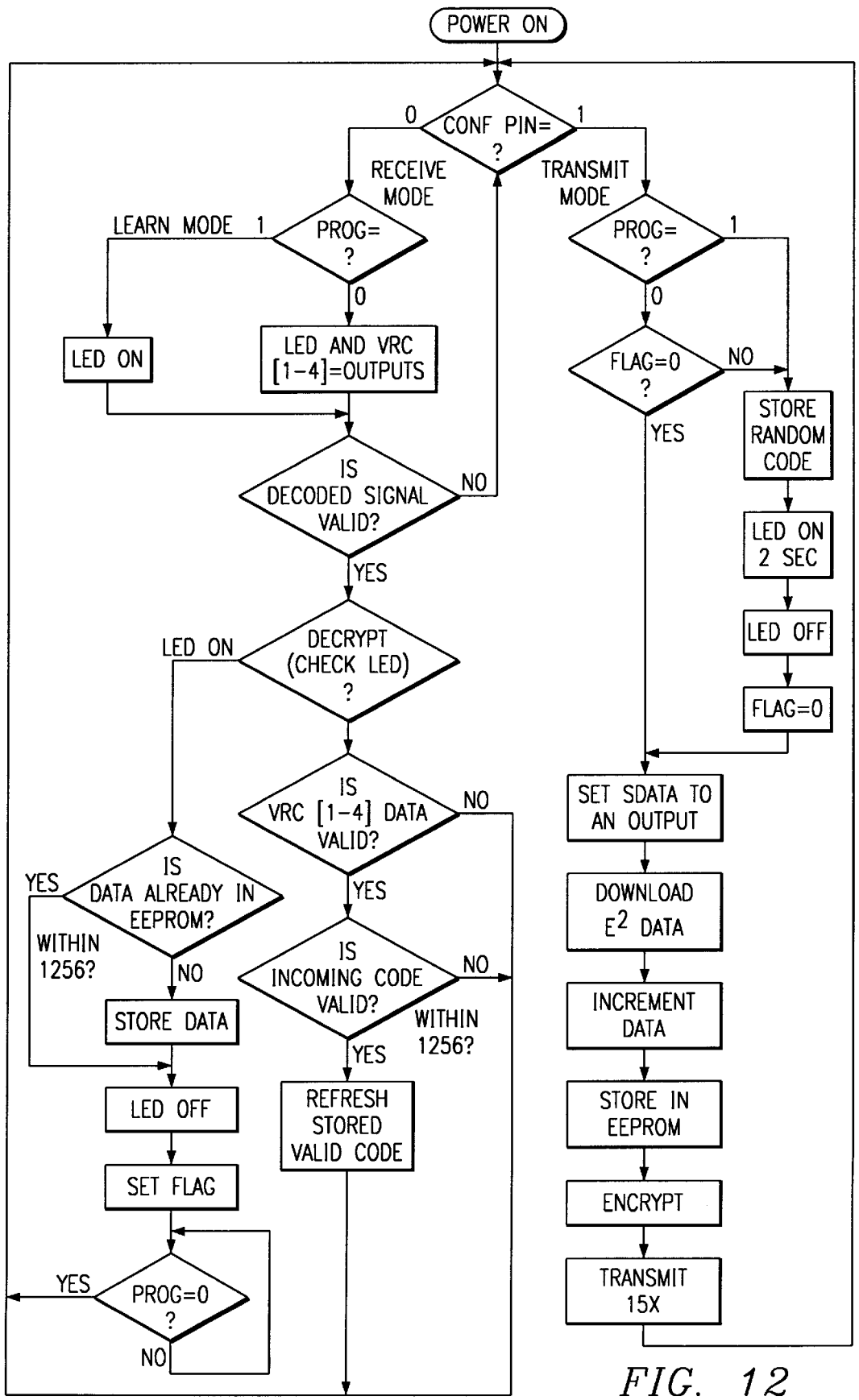
FIG. 12 is a flow chart illustrating transmitter lock.

Referring back to the functional diagram of FIG. 7, configuration logic 44 configure IC 20 as a receiver or a transmitter. In actuality, microcontroller 40 of FIG. 2 performs the configuration as illustrated in FIG. 12. Upon power up, a program embedded in ROM 32 causes microcontroller 40 to sense CONF pin 2. If a logic high is sensed, microcontroller 40 causes IC 20 to configure itself as a transmitter. If a logic low is sensed, microcontroller 40 causes IC 20 to configure itself as a receiver.

In FIG. 8, transmitter 52 has a unique identification code which is encoded into a serial digital data format when transmitter is activated. The digital signal is modulated onto a channel (usually radio frequency or infra-red). Receiver 54 demodulates the signal and decodes the serial digital information. The identification code is compared to the code(s) stored in receiver 54. If a match is found, access is granted. In IC 20, a code consists of 40 bits, which means that it can have one out of 2$^{40}$ (1 trillion) possible values. A transmitter normally uses only one code, illustrated as code 1 in transmitter 52. A receiver has the option of learning several (4). This allows several separate transmitters to activate the same receiver.

Figure 9A:
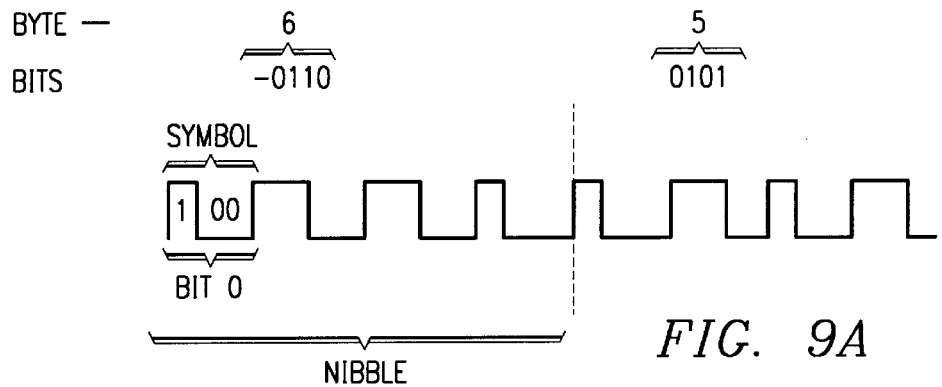
FIG. 9a is a diagram of a byte of data.
Figure 9B:
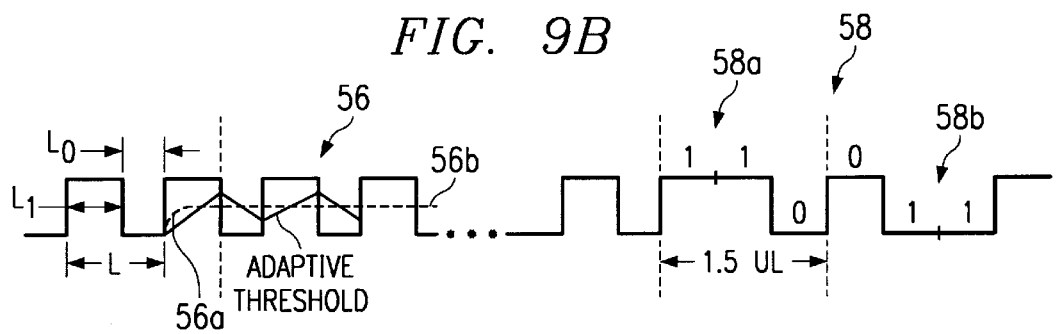
FIG. 9b is a timing diagram illustrating the transmission of a data stream by the transmitter of FIG. 8.
Figure 10:
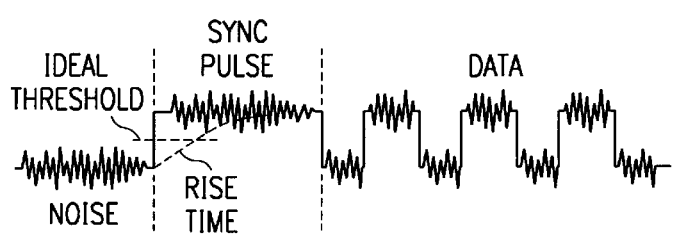
FIG. 10 is a prior art drawing illustrating transmission of a data stream.

Referring now to FIG. 9, the data format used by IC 20 is illustrated. The serial data transmitted by transmitter 52 of FIG. 8 consists of a synchronization sequence 56 (used by receiver 54 to recover timing information), followed by forty security bits and eight bits that represents the parallel data (four bits, transmitted twice in a row) which collectively are represented by reference numeral 58. In contrast with prior art techniques which use a long sync pulse as shown in FIG. 10, synchronization sequence 56 consists of twenty four data pulses with nominally 50% duty cycle (one time unit high and one time unit low, or 1010101010 . . . 10, for equal amounts of time). The forty eight bits carrying information are encoded as a 110 (logic "1") or 100 (logic "0"). Three data pulses are encoded into symbols for logic "1" and logic "0". Reference numeral 58a represents the encoded logic "1" and reference numeral 58b represents the encoded logic "0".

In FIG. 9, the data format generated by transmitter 52 is received by self adaptive amplifier/comparator filter 43 (FIG. 7) of receiver 54. Some noise usually precedes sync sequence 56. Amplifier/comparator 43 searches and synchronizes the data stream to extract the data back. Since sync sequence 56 is comprised of a number of data pulses, as opposed to one long pulse, the time constant 56a of filter 43 rises very quickly and goes to the average value of the incoming signal much faster than prior art techniques thus providing much more reliable detection. Since three time units are encoded data, the actual duty cycle is not 50% anymore, but rather 33% or 66%. The data signal thus has more AC components and less DC noise components which aids filter 43 to rise quickly and keep its adaptive threshold switching value 56b in about the middle of the signal.

Still referring to FIG. 9, receiver 54 must determine when sync pulse 56 is finished and when data sequence 58 begins. Microcontroller 40 accomplishes this by comparing the pulses. An algorithm in EEPROM uses microcontroller 40 to look for each pulse. The sync pulse roughly should have a 50% duty cycle and the actual criterion used by microcontroller 40 is that sync pulse 56 would be between the range of 3/8 and 5/8. L represents one high/low transition pulse of sync pulse 56 comprised of high signal L1 and low signal L0. Microcontroller recognizes a valid sync pulse when 3/8 L<L1<5/8 L.

Still referring to FIG. 9, the symbol detection is slightly different. If microcontroller 40 detects eight consecutive pulses that have the same 50% duty cycle, then that length is considered as a unit length UL and everything else is referred to it. This means that a symbol 58a or 58b is 1.5 UL. Microcontroller 40 recognizes a valid symbol when 11/8 UL<L<13/8 UL. So, the algorithm first looks for eight valid sync pulses, that is, at least eight pulses that have 50% duty cycle. After this, microcontroller 40 then looks to determine symbols by the formula 11/8 UL<L<13/8 UL. Now a determination between the symbol logic "1" 58a and the symbol logic "0" 58b must be made. This is done by comparing the length of the symbols. The algorithm determines a logic "1" if L1 is longer than a L0. If L0 is longer than L1, a logic "0" exists. This can be further refined with additional constraints such that L1 needs to be between 3/8 and 5/8 and L0 needs to between 7/8 and 9/8. Of course, the algorithm can be set to reverse the logical "0" and the logical "1" determination. So, every comparison is made on a ratio metric basis compared to total unit length UL to distinguish between sync and data. One of the advantages of using ratios 3/8 and 5/8 is that division by eight is very easy in binary. This allows the determination to be made real time efficiently at a very high rate. Since symbols have a different length (3 bits) than sync pulse (2 bits) they can be easily distinguished by the decoding algorithm. The difference between a logic 0 or a logic 1 can be determined by checking whether the duty cycle is more or less than 50%. The fact all pulses are close to symmetrical guarantees a frequency contents that helps the adaptive filter 43 threshold detector.

As mentioned above with reference to FIG. 8, transmitter 52 has one identification code stored in EEPROM 36 and receiver 54 may recognize 4 codes at any one time. EEPROM 36 contains four banks of forty bits that are used for security code and an additional eight bits used for check sum (error correcting). The total EEPROM memory is 168 bits plus a few extra bits bringing the total to 192 bits. When configured as a receiver, these banks store up to four learned codes; when configured as a transmitter, only the first bank of forty bits is used as a security code. Channel differentiation which is described by position of an additional four symbols actually sent twice in a row (to avoid corruption of data) sent to identify the channel(s) that have been activated. More than one channel can be activated at the same time. At the receiver, after the first forty bits are found to match one of the four forty bit codes stored in EEPROM 36, the last four symbols are decoded and used to enable the appropriate channel(s). If desired, a four bit binary decoder could be used at the receive to control up to 16 devices, one at a time, based on the four channel output.

Figure 11:
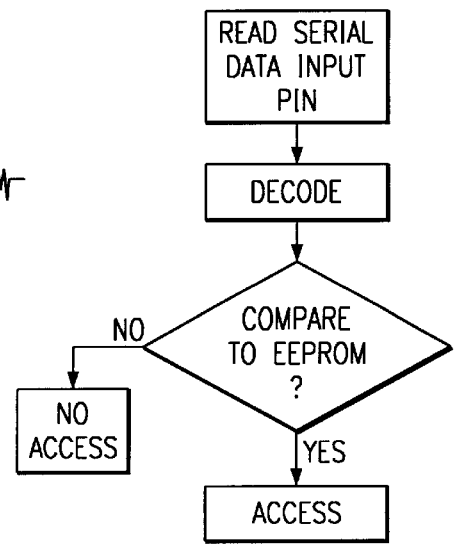
FIG. 11 is a flow chart illustrating receiver access grant.

Referring now to FIG. 11, when transmitter 52 sends out the serial data stream, receiver 54 receives the stream, decodes the stream and stores the forty bit identification code into RAM 34. MPU 30 compares the received forty bit identification code against the codes stored in EEPROM 36. If a match occurs, access is granted and the data bits are sent to output pin 1. If no match occurs, nothing is done. IC 20 advantageously has capability to learn the transmitted code of receiver 54 as is next explained.

The learn mode is accessible on the receiver by placing a logic high on PROG pin 3. Microcontroller 40 then monitors DIN pin 1. When a valid serial input stream is received, it is decoded as explained above. The extracted identification code is then added to the list of authorized codes in EEPROM 36 of the receiver. The receiver can learn up to four transmitter codes. If programming is attempted for the fifth time, the receiver overwrites the first stored code.

Having an integrated circuit that can be used a transmitter, as a receiver, and having learn capability offers powerful advantage. An additional function called transmitter lock ensures that any time after the learn mode is entered on IC 20, the transmit mode for that IC 20 cannot be activated without first erasing any memorized identification codes. This advantageously prevents a dishonest user from putting a receiver chip in learn mode, eavesdropping on someone else's data transmission and thereby learning their code, taking his chip out and sticking it into a transmitter board to obtain a "duplicate" unauthorized transmitter.

FIG. 12 is a device flow chart for IC 20 showing the transmitter lock feature. Whenever IC 20 is taken into the learn mode, a flag is set and permanently programmed into EEPROM 36. Upon power on reset, microcontroller 40 checks CONF pin to determine if IC 20 is to function as a transmitter or as a receiver. If it is to function as a transmitter, microcontroller 40 checks the flag status stored in EEPROM 36. If the flag is not set, then this indicates IC 20 has not previously been configured in learn mode and normal transmission occurs. If the flag has been set, the memorized identification codes are randomized (which has an effect similar to erasing).

With respect to FIGS. 12 and 8, to further avoid an unauthorized user learning transmitter 52's identification code, the code is changed (rolled) by microcontroller 40 according to a fixed sequence process, known only to transmitter 52 and receiver 54 but unknown to any potential eavesdropper. Before specifically detailing the method, general operation characteristics are provided.

Each time code is transmitted, the process adds one and then encrypts the code before transmission. Receiver 54 decodes this encrypted data back into the original code. This is done independently for each of the four channels, and for each of four learned transmitter codes. Each time the transmitter button is pressed (for any of the four channels), the rolling code method first increments the 40-bit security code and stores this in EEPROM 36. It then encrypts the incremented code and transmits it. The last incremented and nonencrypted code is always memorized in the transmitters nonvolatile EEPROM memory, so that the current position in the sequence is remembered even when the power is removed. As earlier indicated, each identification code consists of 40 bits, which yields a total of $2^{40}$ (1 trillion) possible values. The encrypting program is constructed to repeat the same code only after $2^{40}$ activations. Receiver 54 receives the transmitter's encrypted code. Next, it decrypts the code and stores it in RAM. A comparison is done between the code in RAM and the previous valid code stored in EEPROM. If the RAM code is within 256 of the EEPROM code, it is considered valid. The valid code replaces the previous code stored in EEPROM. The sequence will be repeated for the next transmitted valid code. If the code is not valid, it will not be stored in EEPROM, the channels will not be activated and access will not be granted. The receiver activates (grants access) whenever a valid code is received. This way, the transmitter can be activated up to 255 times without the receiver accepting the signal, and synchronization will not be lost. For example, in some cases, the transmitter could send code without the receiver decoding the signal (if the receiver is out of range, for example). This would normally cause the transmitter and receiver to fall out of sequence with each other. However, the receiver is advantageously allowed to activate on any of the next 256 expected codes from the transmitter based upon the currently stored 40-bit security code. In an extreme rare case, the transmitter could be activated more than 256 times without the receiver receiving a valid transmitted code. Re-synchronization can be accomplished by having the receiver simply "relearn" the transmitter code by using the above described Learn Mode.

When a valid code is received by receiver 54, the appropriate channel output is enabled. Immediately after this, receiver 54 stores this new received code in its EEPROM 36. A 'valid code' is defined as a code which was expected by the receiver based on the last received code (which is stored in EEPROM memory). Since the receiver only activates on the next expected code from the rolling code sequence, interception and subsequent retransmission of the same code will not allow activation of the receiver.

Attention is now directed to the rolling code program. The transmitted code is encrypted, and decrypted, using an exclusive OR, XOR, operation on the 40 bit code. The 40 bits are divided into 5 bytes of 8 bits each as shown in FIG. 13 where S4 is the most significant and S0 is the least significant. S4–S0 is the non-encrypted data. A 40 bit binary "up" counter (software implemented) is used as a primary number generator. The actual sequence is generated by encrypting the primary number. The encryption program operates on 5 bytes, primary words, as follows below. It generates encrypted binary numbers E0–E4 that are each 5 bytes long.

Let S0–S4=primary security code bytes 0–4.

Let E0–E4=encrypted code bytes 0–4.

S0–S4 cycles sequentially from binary 0 to $2^{40}$ −1. The encrypted bytes E0–E4 are derived (from security code) using XOR operations. Likewise, the security code can be derived (from the encrypted data) using the reverse operation. Both operations are shown below:

Encryption method (used in transmitter):

| | simplified | |
|---|---|---|
| $E0 = S0$ | | $E0 = S0$ |
| $E1 = S0\, S1$ | | $E1 = E0 \oplus S1$ |
| $E2 = S0 \oplus S1 \oplus S2$ | | $E2 = E1 \oplus S2$ |
| $E3 = S0 \oplus S1 \oplus S2 \oplus S3$ | | $E3 = E2 \oplus S3$ |
| $E4 = S0 \oplus S1 \oplus S2 \oplus S3 \oplus S4$ | | $E4 = E3 \oplus S4$ |

Decryption method (used in receiver):

S0=E0
S1=E0⊕E1
S2=E1⊕E2
S3=E2⊕E3
S4=E3⊕E4

The table in Appendix 5 illustrates the first ten encryption outputs of the total of $2^{40}$ or 1 trillion possible codes.

Appendix 6, pages 1–2 contain an encryption/decryption example. As the table and the appendix show, in every byte, at least one bit of the least significant byte changes. As the program executes, a lot of bits begin changing, as opposed to having a simple count. This advantageously makes it harder for an unauthorized individual to reverse the encryption as the bits appear to change randomly. Since the least significant byte is always changing, if it is exclusively OR'd with another number, the second least significant byte will also change by at least one bit and so on.

Appendix 7, pages 1–6 contains the program used in the rolling code method. In the transmit mode, the data (S0–S4) from EEPROM 36 is down-loaded to RAM 34. The data (S0–S4) is incremented by one. The incremented data (S0–S4) is stored back into EEPROM 36. The incremented data (S0–S4) in RAM 34 is encrypted which generates (E0–E4). In the receive mode, the encrypted data (E0–E4) is received and stored in the receiver RAM 34. The encrypted data (E0–E4) is decrypted back to its original form (S0–S4). The data in RAM 34 is compared to the data in EEPROM 36 by binary subtraction to look for a match. If the comparison shows the four most significant bytes stored in RAM minus the four most significant bytes stored in EEPROM equals zero, then the two are within 256 of each other. A match is when the data in the RAM and the data in the EEPROM are within 256 of each other. To look for a match 0=(RAM data-EEPROM data-1)=255 or less means MATCH. If a match is found the new data is stored in the EEPROM of the receiver. It will be compared against the next incoming code and the new code will be valid if it is within 256 of the stored data.

In an additional explanation of the rolling code method: if A represents the previously stored decrypted value (EEPROM) and B represents the decrypted version of the last received (RAM) code, then A is subtracted from B. Then, a binary 1 is subtracted from the result. If the 4 most significant bytes of the final result are equal to 0, the original numbers were between 1 and 256 apart and access is granted. The mathematical formulas are:

$$A < B = A + 256 \qquad\qquad 1.$$
$$0 < B - A = 256 \qquad\qquad 2.$$
$$0 < A - 1 = 255 \qquad\qquad 3.$$

If equation 3 is met, then the original numbers were between 1 and 256 and a match is found.

To program the receiver, the device is set for the learn mode. In the learn mode, the encrypted date E0–E4 is transmitted to the receiver. The receiver decodes the data (E0–E4) and decrypts it which produces (S0–S4). It stores the decrypted data (S0–S4) in RAM 34. The data (S0–S4) which is stored in the RAM is then stored in the EEPROM is checked against the data stored in EEPROM 36. If no match is found or the two sets of data are not within 256 of each other, then the new data (S0–S4) is not stored. As the program shows, the program is relatively short; it takes very few bytes of ROM storage. And, it is very quick, taking only a couple of microseconds to calculate. The scheme is bi-directional, uses very little instructions, and uses the whole number, as opposed to a truncated number.

FIG. 16 illustrates the operation of the receive mode. In step 102, the LED and switches are set to output steps the LEDs. The Din/Dout is set to input. The setting of the switches to outputs or inputs allows data to be input or output through the I/O interface (FIG. 2) of the micro processor. In block 104, the mode variable is set to 01 to indicate that the device is in a receive mode. Additionally, in block 14 a variable CNT14 is set to zero. In decision block 106, it is determined if the variable CNT14 equals 1. If the results of the decision block 106 are no (or CNT14=0), then the decode section in block 112 is executed. There is no apparent exit from the decode routine, because the program immediately continues into the decrypt section. Eventually, after the code was decrypted and it was determined whether there was a match or not, the variable MODEVAR determines whether the mode was "receive" or "learn". After executing the appropriate code, the program eventually returns to START.

If the results of decision block 106 is yes, then the variable CNT14 indicates that, at least one valid frame has been received from the transmitter. The one-shot is a piece of hardware that is connected to the 4 output ports of the device. It is used to determine how long the outputs remain active after a valid frame was received. Every time a frame is received, the one-shot is "triggered" and a counter starts running. When the counter reaches a certain value, the one-shot "times out" and all outputs are returned to inactive.

In decision block 108, it is determined if tibyte3 bit2 equals 1, if yes, then the programming pulse routine is initiated in block 110. If the result is no, then decode section 112 is again executed, because another frame is being sent from the transmitter.

Figure 17A:
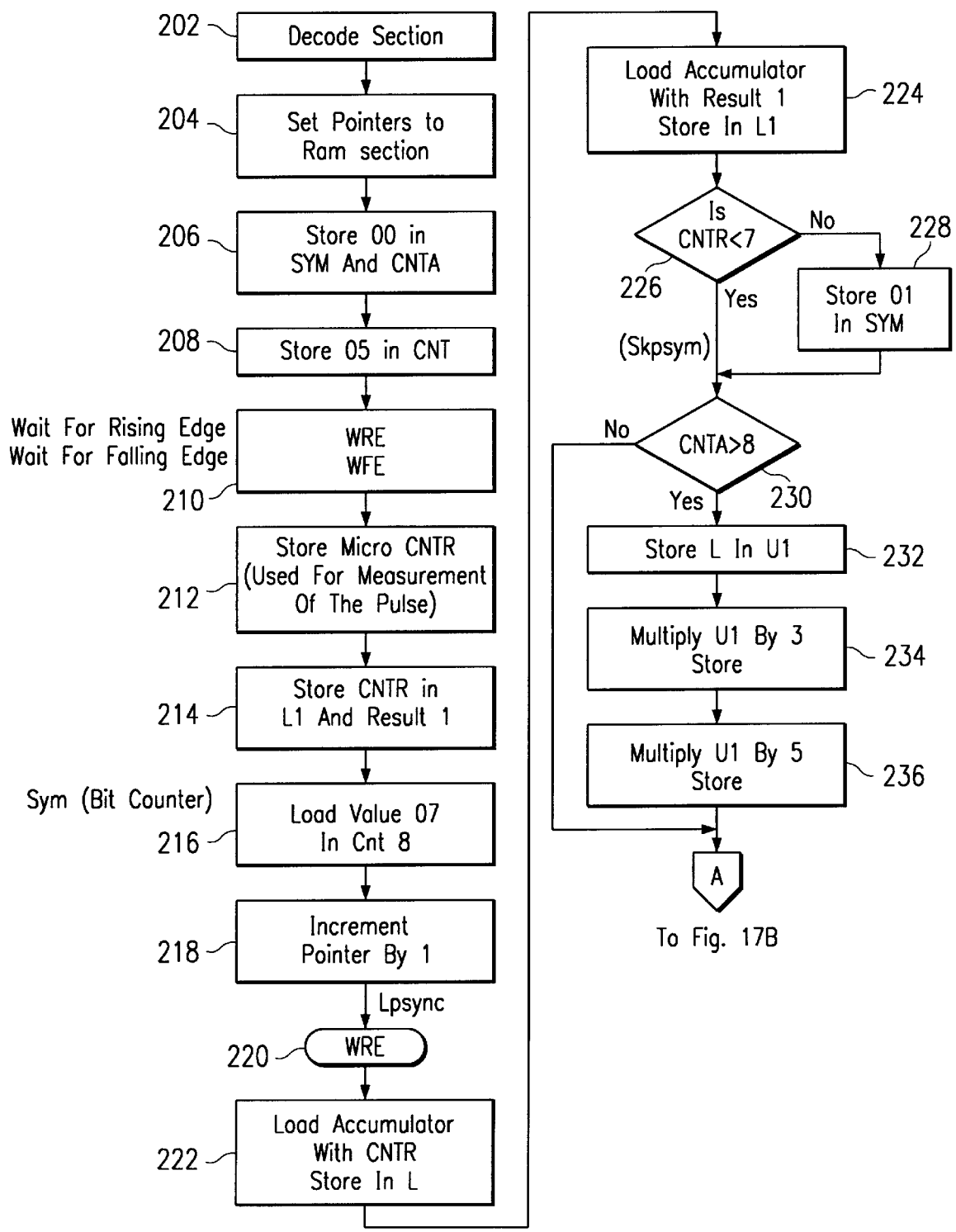
FIG. 17 illustrates the flow chart for the decode section.
Figure 17B:
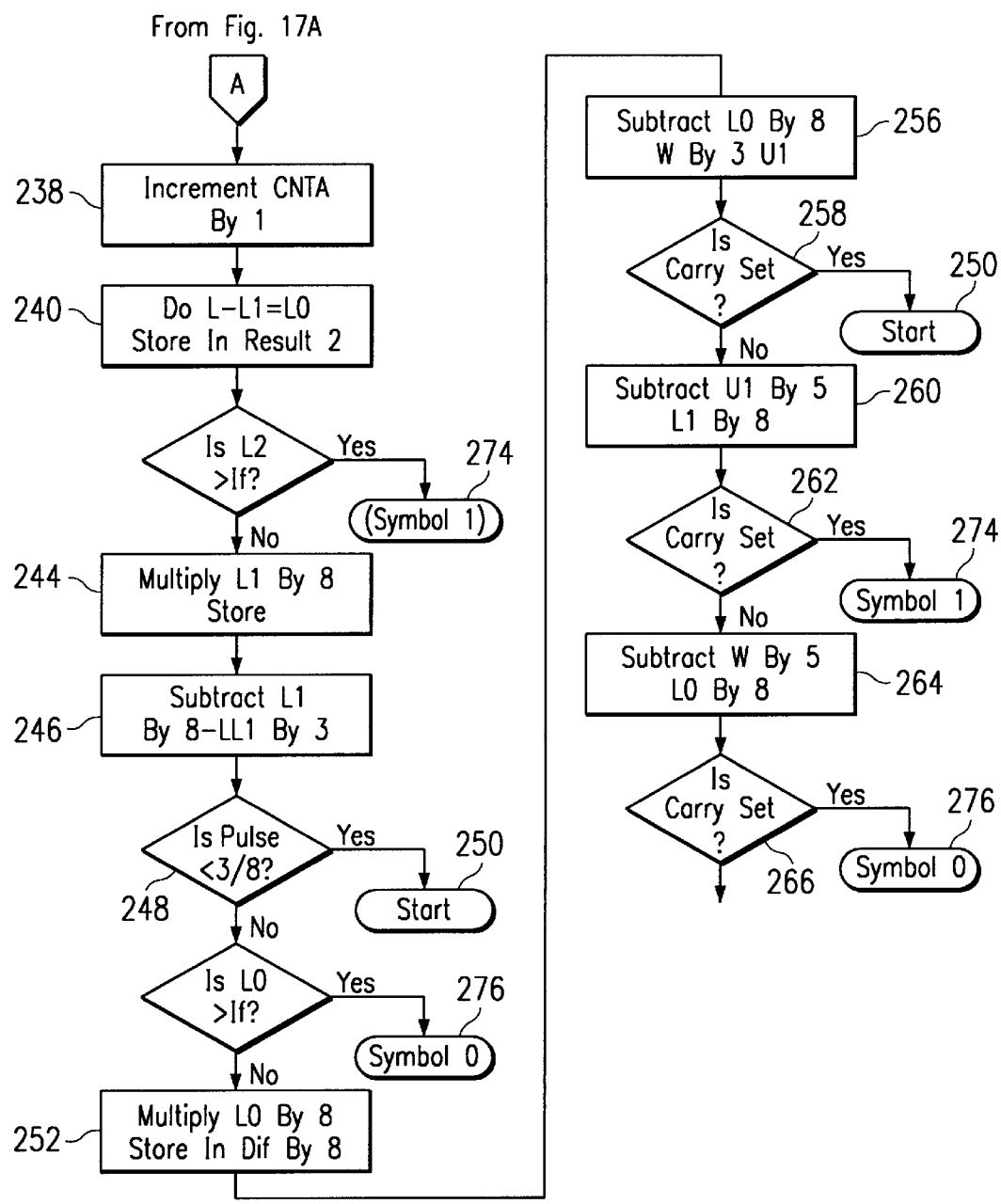

The decode algorithm is described next in FIG. 17. In block 204, a high byte pointer and a low byte pointer are set to the RAM section. RAM section here refers to the section in memory that contains RAM, not to a section of the program. In block 206, a hex 00 is stored in the variables SYM and CNTA. The SYM variable is set to 00 until at least 8 valid synchronization pulse have been decoded. CNTA keeps count of the number of sync pulses decoded. When CNTA is set at least eight or greater, then SYM is set to 01. CNT is updated each time. In block 208, store a hex 05 in the variable CNT. In block 210, a wait for a rising edge and then wait for a falling edge instruction of the internal clock is issued. With it a comparison is made with incoming syncs and symbols and the high times and the low times are compared and measured, to determine if the data is valid. This is accomplished by determining the time between a rising edge and a falling edge. The CNTR in question really refers to block 24 on FIG. 2 (synchronizer/counter). This piece of hardware is described in detail in another section of the spec. In short, the counter measures the number of clock pulses between rising and falling edges of the incoming serial data. This is read by the micro-controller and used in the algorithm. In block 212, the value of the micro CNTR, which is used for a measurement of the pulse, is stored in RAM. In block 214, the micro CNTR is stored in variables L1 and Result+1. From this, it can be determined the duty cycle of the digital pulses, for example, a 50% duty cycle. Next, it is determined if sync pulses which are used to achieve synchronization, are followed by symbol pulses which convey data to the receiver. The sync pulses are used by the receiver to determine the speed of the symbol or data pulses if the data pulses are transmitted at the correct speed, then the receiver will decode and store them in RAM. In decision block 216, the value 07 is loaded into the variable CNT8. CNT8 checks for 8 bits of correct data. When CNT8=0 CNT will subsequently be incremented. In block 218, the pointer is incremented by 1. In block 220, a wait for a rising edge is executed. In block 1222, the accumulator is loaded with the variable count value from the micro. It is stored in a variable L, which corresponds to the total length of the digital wave. In block 1224, the accumulator is loaded with the variable Result1. This variable is stored in a location which corresponds to variable L1, which corresponds to the length of time the digital pulse is on. In decision block 226, it is determined if the variable CNTA is greater than hex 7. If the result is yes, then in block 228 a 01 is stored in the variable SYM. If the decision block 226 results in no, then control is passed to decision block 230. In decision block 230, it is determined if the CNTA is greater than 8. If the result of decision block 230 is yes, then variable L is stored in variable U1. Next, in block 234, the variable U1 is multiplied by 3 and then stored in the variable U1by3. In block 236, the variable U1 is multiplied by 5 and stored in the variable U1by5. In block 238, the variable CNTA is incremented by 1. The symbols received by the receiver are 48/6 bytes, resulting in 48 bits in asymmetric format, plus the 48 bits are 6 bytes of data. The data stream indeed contains 48 "symbols": 40 bits of identification code, plus 2 times 4 bits of "channel data" (the status of the switches). This data is controlled by two counters. One of these counters is CNT5 and the other inner counter is CNT8 which CNTs the number of bits. The CNT8 variable keeps track of the bits of information within a byte, and once this counter overflows by going over 8, a new byte of information is started. After this has been completed 5 times, the 5 bytes or 40 bits of information have been received. Thus, by counting down the two variables CNT5 and CNT8, the data is received systematically. Control passes to block 238. If the results of decision block 230 is no, then control additionally passes to decision block 238. In block 238, CNTA is incremented by 1. In block 240, the instruction L−L1=L0 is done and are stored the results in Result2. In decision block 242, it is determined if L1 is greater than hex 1F. If the result is yes, then in block 274 symbol 1 subtracted routine is executed. If no, then in block 244, L1 is multiplied by 8 and stored in L1by8. In block 246, the variations U1by3 is subtracted from L1by8. If yes, then the program returns to the common start in block 250. This indicates that the received pulse is too small, and the receiver should be ready to receive another series of pulses. If the results from decision block 248 is no, then in decision block 252 it is determined if L0 is greater than hex 1F. If yes, then control is transferred to symbol 0 in block 276. In block 254, the variable L0 is multiplied by 8 and stored in the variable Difby8. In decision block 258, if L0<3/8U1, then the pulse is too small the carry is set. And, if the results of decision block 258 is yes, then control is transferred to start in block 250, since the signal is too short. In block 260, the variable L1by8 is subtracted from U1by5. In decision block 262, if the carry is set, then control passes to symbol1 in block 274, indicating that the signal is too long to be a synchronization pulse so it must be a symbol1. In block 264, L0by8 is subtracted from U1by5. In decision block 266, if the carry is set, positive the pulse is to long to be a negative sync so it must be a symbol0 the symbol0 is executed in block 276.

Figure 18:
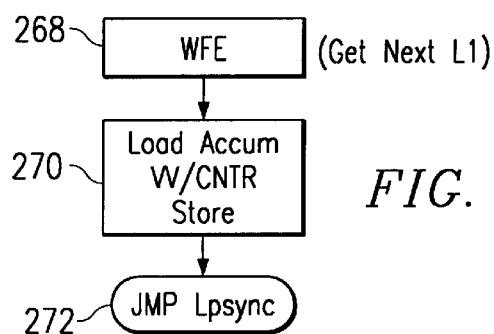
FIG. 18 illustrates a continuation of the flow chart for decode section.
Figure 19:
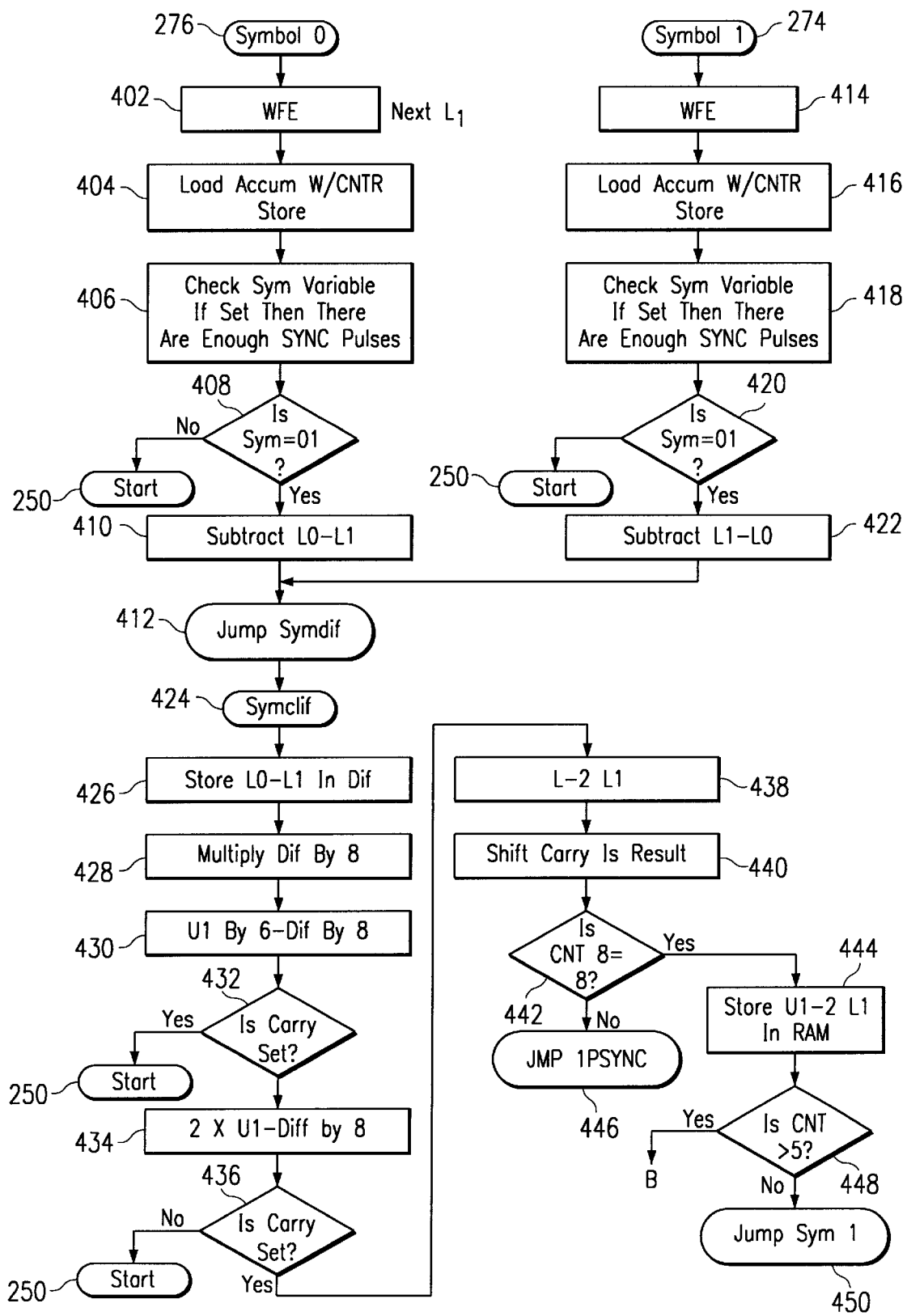
FIG. 19 illustrates a further continuation of the flow chart for the decode section.

The flow chart continues on FIG. 18. In block 268, the wait for falling edge instruction is executed to get the next L1. In block 270, the accumulator is loaded with CNTR and stored in RAM variable Result 1. In decision block 272, the control is passed to block 220, because at this time all pulses have been valid sync pulses. There has not been any invalid pulses or symbol1 a symbol0. The program jumps to 1psync to verify the next incoming pulse.

Turning to FIG. 4, after execution has been transferred to block 276, a wait for falling edge instruction is executed in block 402, for the next $L_1$. In block 404, the accumulator is loaded with the count from the microcontroller CNTR which indicates the amount of time during the wait for falling edge. The results are stored in Result 1. In block 406, the SYM variable which represents whether or not sufficient sync pulses have been received, is checked. If there have not been at least 8 sync pulses before a symbol then the program returns to start. In decision block 408, it is determined if the SYM variable is equal to hex 01. If the result of decision block 408 is no, then the block 250 is executed to return the routine back to start. If the results of decision block 408 are yes, then in block 410, L1 is subtracted from L0. In block 412, execution is transferred to the routine labeled symdif at block 424. If decision block 274 is executed, then a wait for falling edge instruction is executed in block 414. In block 416, the accumulator is loaded with the count from the microcontroller CNTR while the wait for falling edge instruction is executing to determine the length of time. The results are stored Result +1. In block 418, the SYM variable is checked to see if there are enough sync pulses. A minimum of 8 valid SYNC pulses must have been received before symbols are allowed. In decision block 420, it is determined if variable SYM equal hex 01. If no, then start at block 250 is executed. If the result is yes, then in block 422, L0 is subtracted from L1. Control is passed to block 424 or subroutine symdif. In block 426, the results of the subtraction of L1 from L0 is stored in DIF. In block 428, the variable DIF is multiplied by 8 and stored in DIFby8. In block 430, the variable DIFby8 is subtracted from 6U1. In decision block 432, if Difby8 is greater than 6U1, then the pulse is too big an the program jumps to start or block 250 is executed. In block 434, DIFby8 is subtracted from 2U1. If Difby8 is greater than 2U1 the carry is set so the pulse is not too small. If the carry is not set, then the pulse is too small and the program jumps to start. In block 436, it is determined if the carry is set. If no, then start is executed in block 250. In block 438, L1 is multiplied by 2 and is subtracted from L. In block 440, shift carry to variable result. To determine whether a symbol "1" or a symbol "0" was transmitted, the duty cycle of the pulse is checked. If the duty cycle is more than 50% (high time longer than low time), the symbol is a "1". If the duty cycle is less than 50% (high time less than low time), the symbol is a "0". To perform this check, L1 (high time) is compared to L (total time). If 2L1 is greater than L (effectively, this is equivalent to L1 being greater than L/2), the symbol is "1". In decision block 442, it is determined if CNT8 is equal to 8, if no, then jump to lpSync in block 446 is executed. If the results of decision block 442 is yes, then in block 444 the difference of 2L1 subtracted from U1, the byte is stored in RAM. In decision block 448, it is determined if the variable CNT is greater than 5. If no, then instruction 450 is execute which jumps to label SYM1 in block 450. Because all incoming data has not been checked and so all 5 bytes have not been stored in the Rx RAM. If yes, then the instructions of FIG. 5 are executed.

Figure 20:
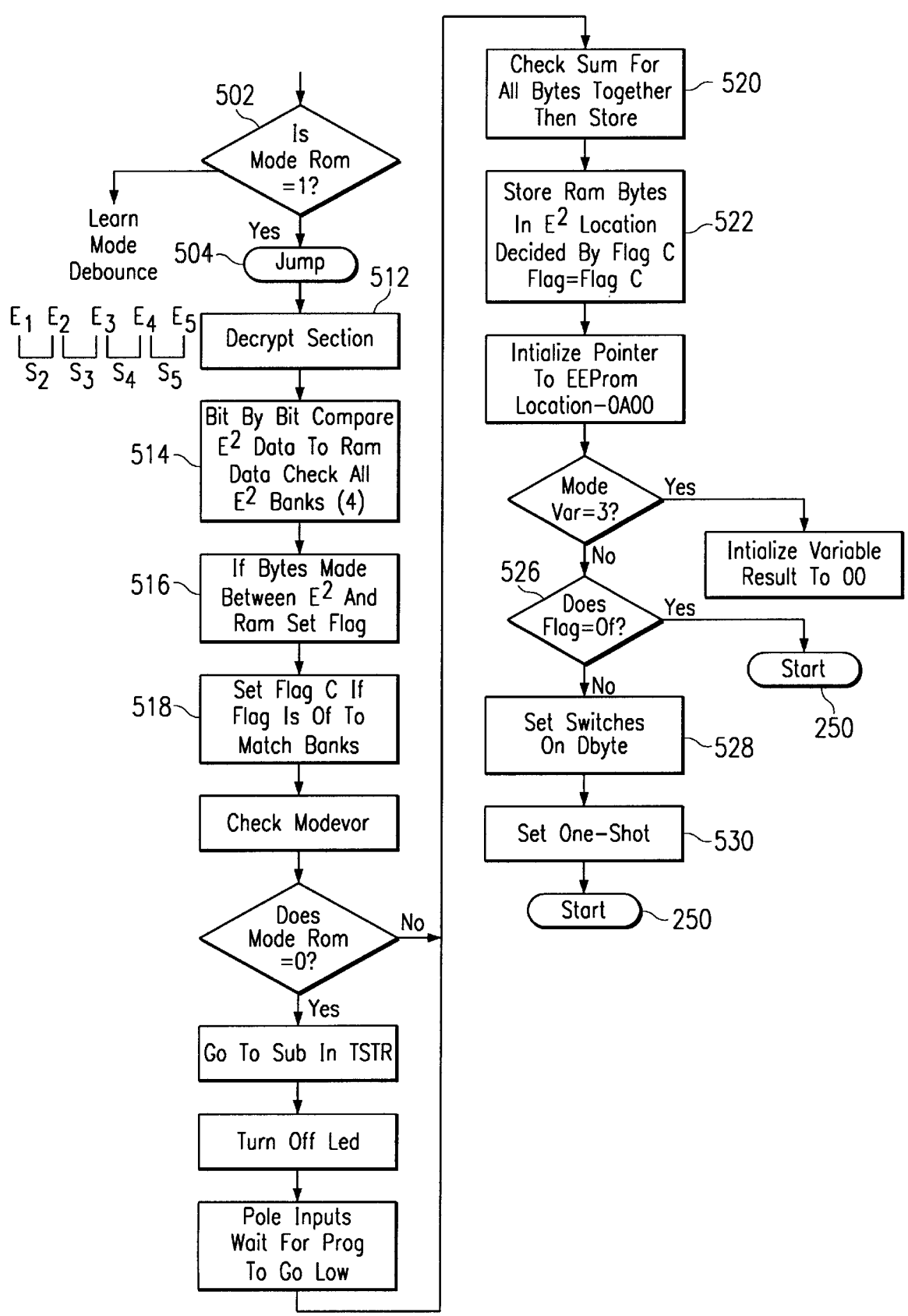
FIG. 20 illustrates yet another continuation of the flow chart for decode section.
Figure 23:
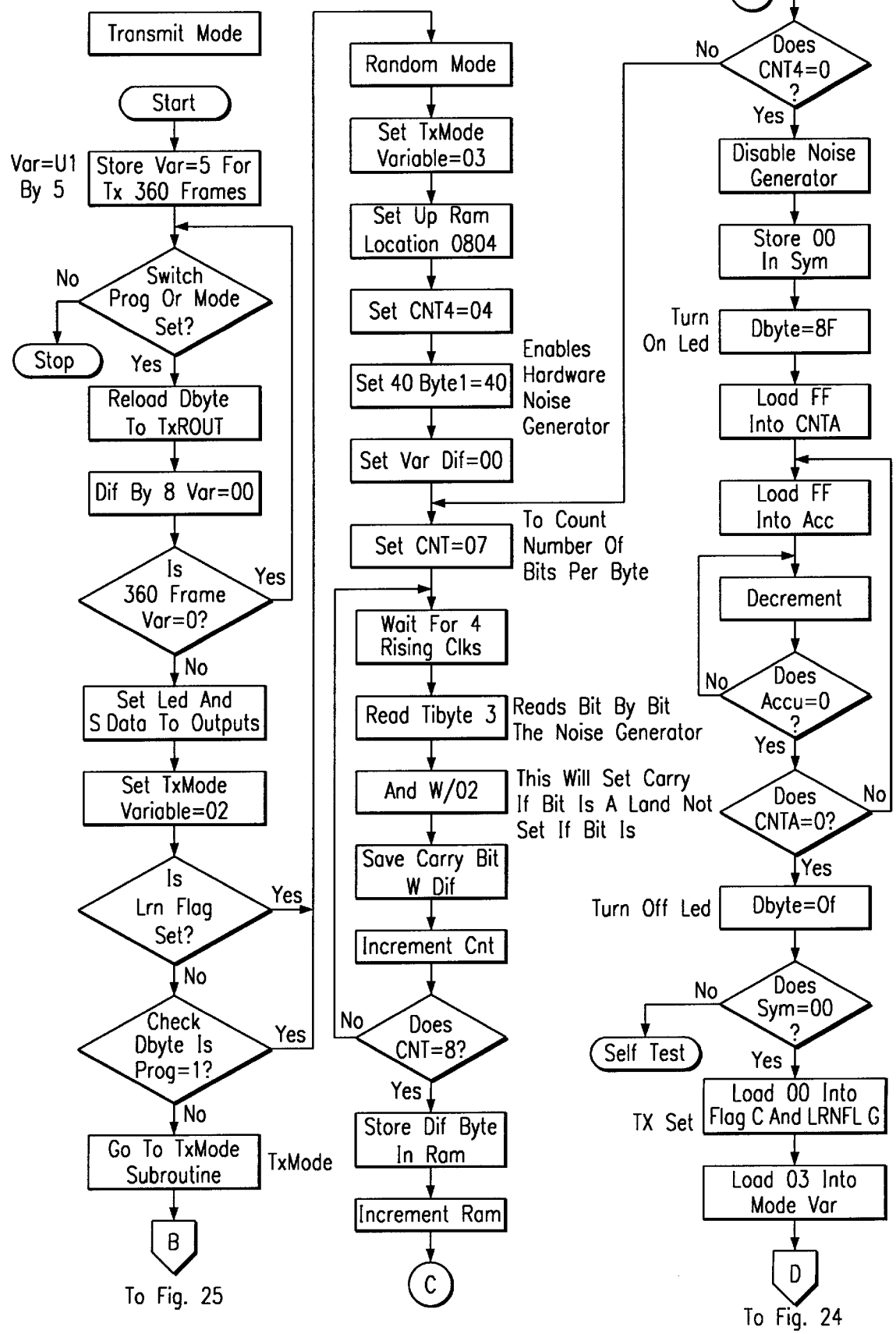
Figure 25A:
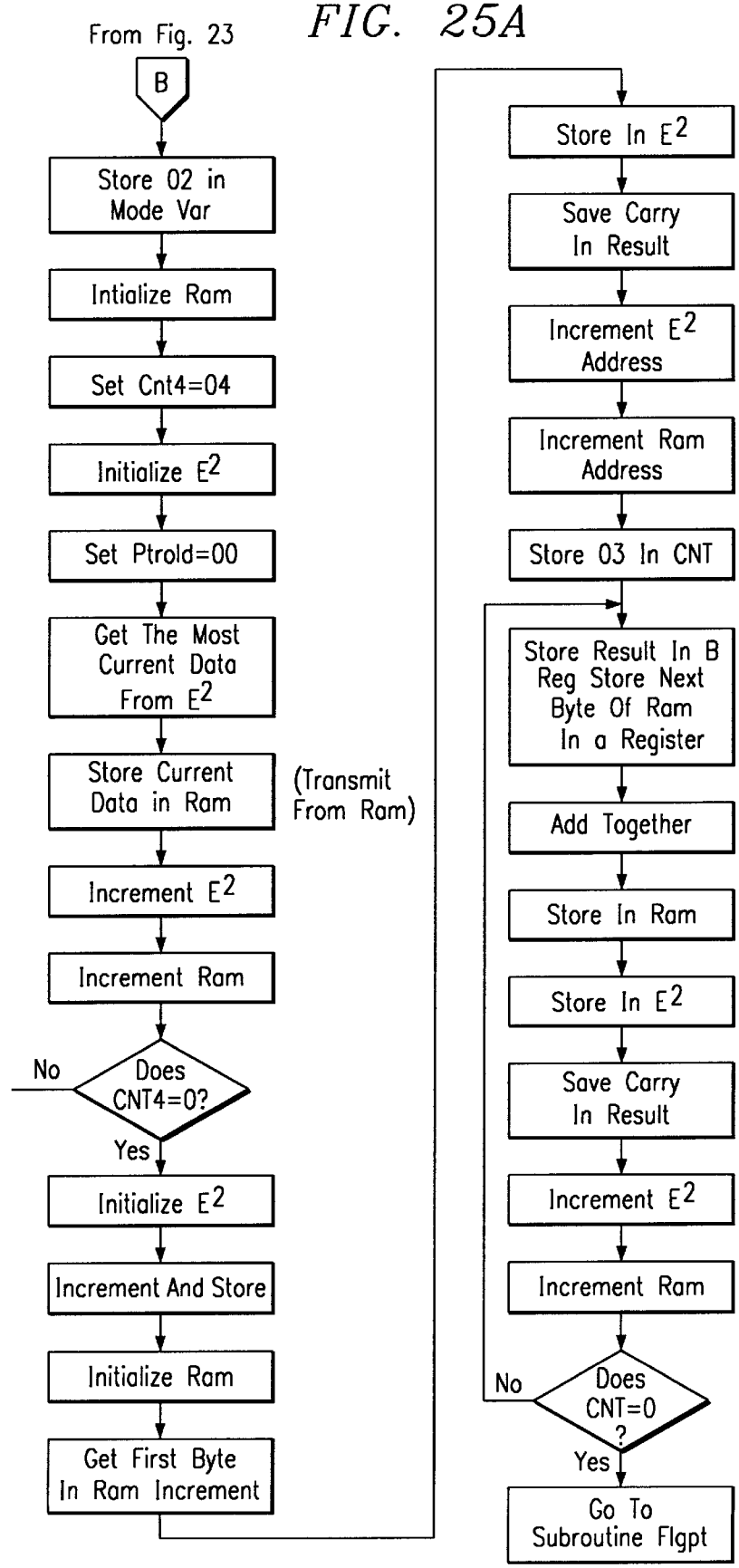
Figure 25B:
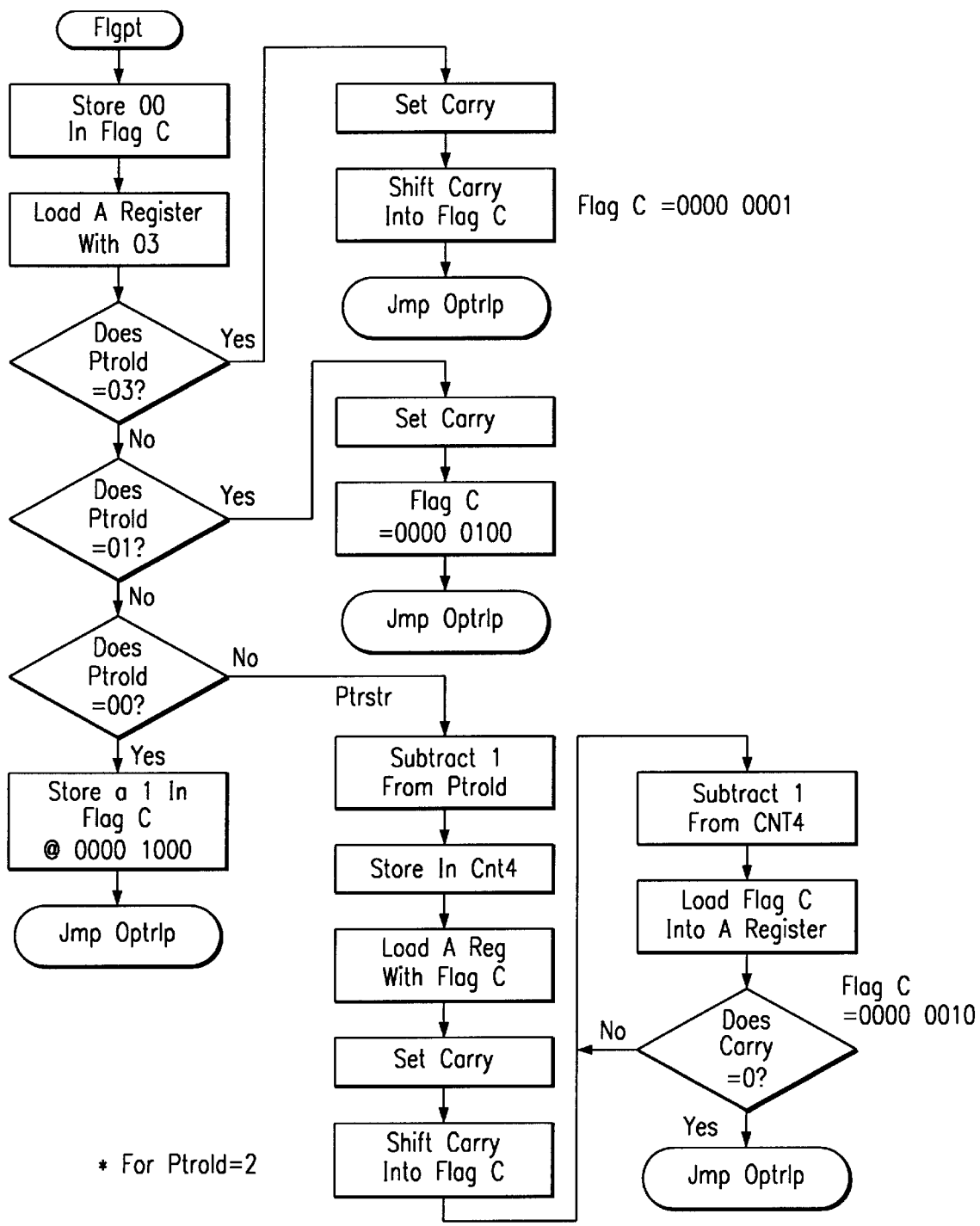
Figure 26A:
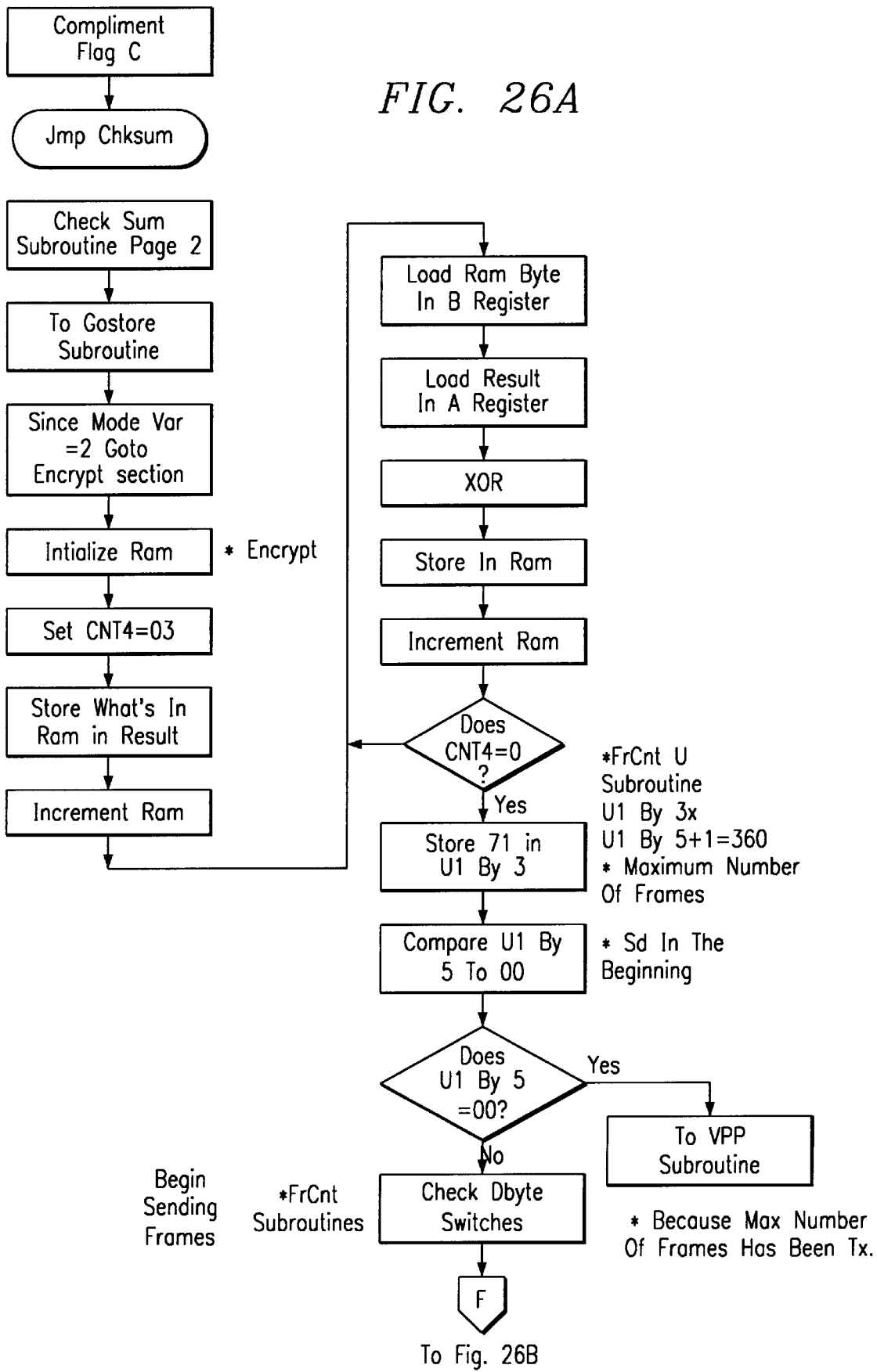
Figure 26B:
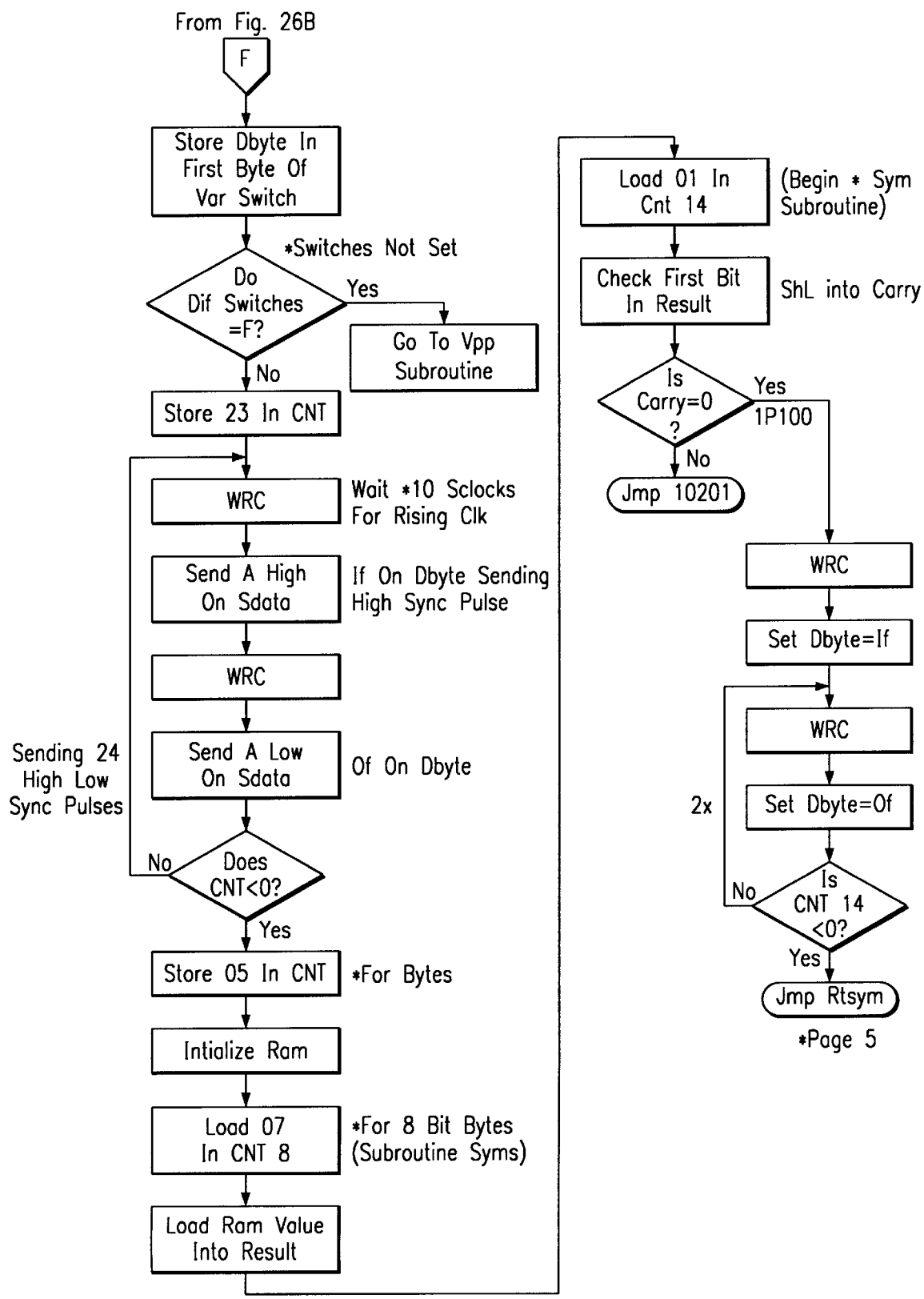
Figure 27:
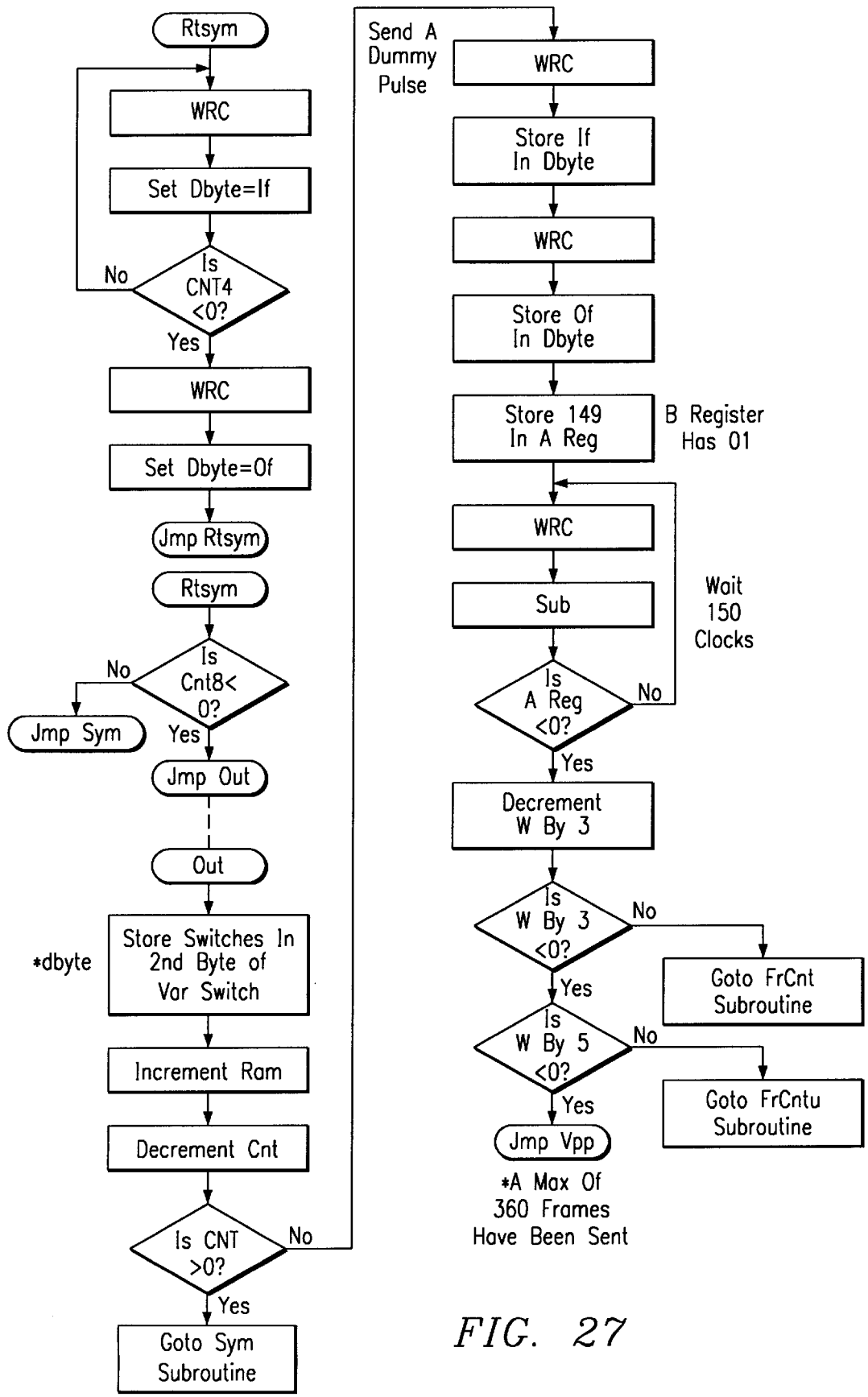

After decoding there are many other feature steps: decrypt, check-sum, compare and store. FIG. 20 illustrates additional steps. In decision block 502, it is determined if the variable mode variations=1. If no, then it is equal to 00, the learn mode debounce sequence is this will poll the Prog input, it is still high (depressed) for a given period of time. If it is not pressed or active for the amount of time (a count of FF which varies with frequency) then the program returns to start. In block 504, the jump PASSLTHE debounce section is instruction is executed, because the device is not in learn mode but receive mode. The Bysync stores the channel data in Byte6 to RAM variable switch. In block 512, a decrypt section is executed the decrypt section does part of the rolling code algorithm. The decryption algorithm is part of the rolling code feature of the IC. The algorithm is described in detail on page 36. It is performed on the 5 incoming data bytes (40 bits of security code), which are stored in RAM. The decrypted 5 bytes of security code are then compared with each of the 4 security codes (called "banks") stored in EEPROM.

In block 514, a bit by bit compare is performed on EEPROM data to RAM data by checking all the EEPROM banks. The new data in RAM is compared with the data stored in EEPROM2. They must be within 256 of each other. In block 516, if the bytes between EEPROM and RAM set flag. The variable FLAG indicates with which "banks" in EEPROM there is a match. No program decision is made at this point; the decision is deferred until later, when the variable FLAG will be checked. In block 516, flag is set. This compares 5 bytes to 5 bytes. The "match" flag is set so it will know which bank had the "match" and where to update.

In block 520, we check the sum by exclusively XOR all 5 bytes in RAM locations 0804–0808 together and then storing results in variable byte 6—RAM 0809. In block 522, RAM bytes are stored in EEPROM locations which is decided by FlagC.

FLAG is a variable that indicates which banks of EEPROM match the received data (which is in RAM). The 4 most significant bits of FLAG are unused. The 4 least significant bits each represent one bank of EEPROM (there are 4 banks in total). Each of the bits is 1 if there is NO match with the corresponding bank, 0 if there is a match.

Each EEPROM bank contains 5 bytes of data, plus a 6th byte of check-sum. Within a bank, a match is determined on a byte by byte basis, using the temporary variable FLAGC. Eventually FLAGC is copied into FLAG.

In block 524, the variable Mode Var is checked. In decision block 526, it is determined if the flag equals hex 0F. If yes, then start at block 250. If not, then set switches on dbyte in block 528. In block 530, set the one-shot and then transfer control to start at 250. The one-shot is a piece of hardware that is connected to the 4 output ports of the device. It is used to determine how long the outputs remain active after a valid frame was received. Every time a frame is received, the one-shot is "triggered" and a counter starts running. When the counter reaches a certain value, the one-shot "times out" and all outputs are returned to inactive.

As illustrated in FIG. 21, in block 602 the learn mode is entered. In block 604, the LED and the switches are set to output. In block 606, the LED is turned on. In block 608, the mode variable is set to equal hex 00. In block 610, the decode section is entered. In block 612, the programming pin is checked for the purpose of debouncing. If the pin does not hold, then control passes to start at block 250. In block 614, the variable byte6 is checked to determine if it holds the correct check-sum value (logic EXOR of bytes 1 through 5), and if not valid execution is transferred to block 250. In block 616, the decrypt section is entered. The decrypt section takes the 5 first bytes that were received (currently stored in RAM), and performs the decryption algorithm (described page 36). This is because the identification code was sent by the transmitter in encrypted form. In block 618, a check is made for match in EEPROM. In block 620, the LED is turned off. In block 622, the debounce occurs until the programming pin is released. In block 624, the location in the EEPROM is incremented. In block 626, the learning flag is set to indicate the part was programmed as a receiver. In block 628, the programming pulse for EEPROM is generated and control is transferred to block 250.

As illustrated in FIG. 22, block 702 illustrates the beginning of the power on reset. In decision block 704, it is determined if the "Prog" pin and switches are on. If yes, then control passes to decision block 706 where it is determined if the "test" pin equals one. If yes, then the product/characterization mode is entered in block 708. If either decision block 704 and 706 are no, then start at block 250 is executed.

In block 710, a 5 is stored in the variable counter. Then control is passed to block 250 and then to block 712 where the accumulator is loaded with Tibyte3 (reflects the state of the test pin) and with hex 01. In decision block 714, it is determined if the variable Tibyte3 equals 1. If yes, then in block 716, the RAM is set to self test. If the determination is no, then in decision block 718, it is determined if the state of "Conf" pin equals 1, if the variable "Prog" pin equals 0, and if the switch input equal 1. If yes, then a stop and wait command is execute in block 720. If no, in decision block 722 it is determined if the state of the pin Conf equals 1. If yes, then the transmit mode is entered. If no, then it is determined if the state of the pin Prog equals 1 in decision block 724. If decision block 724 is yes, then the learn mode is entered and if no, the receive mode 726 is entered.

Figure 28:
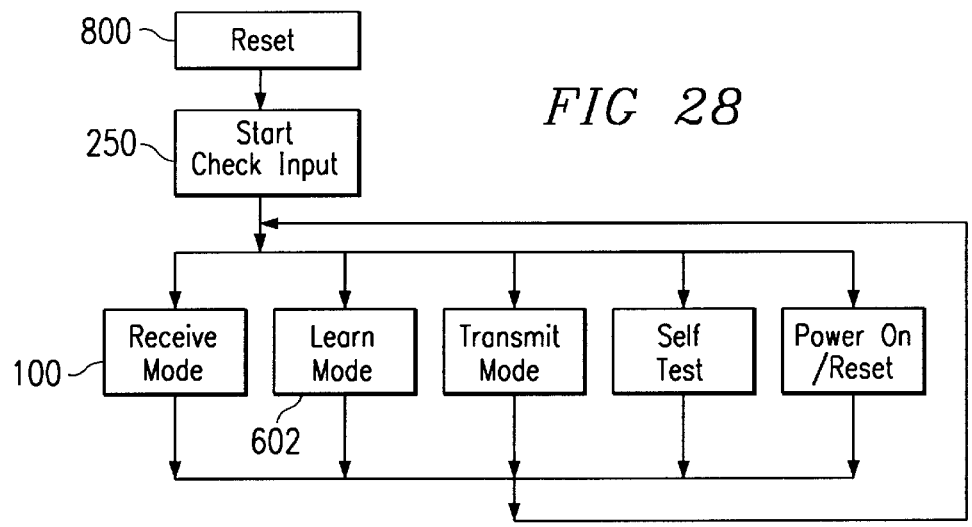
FIG. 28 illustrates the overall flow chart of the present invention.

In FIG. 28, in block 800, a reset has been initiated. In block 250 a start sequence is initiated. Depending on the inputs, either the receive mode, the learn mode, the transmit mode, the self-test or the power/on reset is entered. After each of these modes have concluded then the block 250 is entered.

Figure 29:
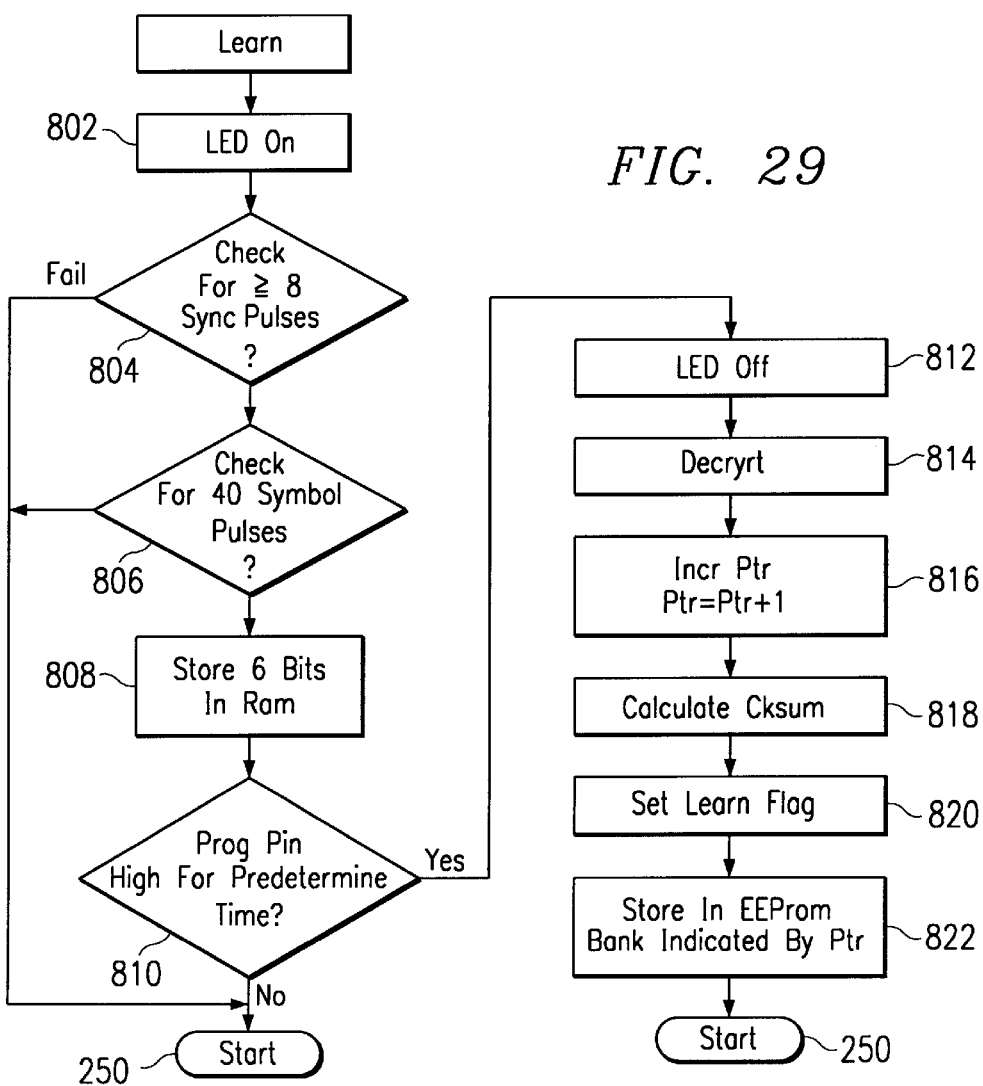
FIG. 29 illustrates an overall flow chart of the learn mode.

In FIG. 29, the overall flow of the learn mode is illustrated. In block 802, the LED is turned on. In decision block 804, it is determined if 8 sync pulses have been received. If more than 8 sync pulses have been received, this indicates that the proper transmitter is not now transmitting and start block 250 is entered. If not, then in block 806, it is determined if there have been 40 symbol pulses received. If not, then decision block 250 is entered. In block 808, 6-bits are stored in RAM. In decision block 810, it is determined if the PROG pin is high for a predetermined period of time. If no, then block 250 is entered. If yes the LED is turned off in block 812. In block 214, decrypt is performed. In block 816, the pointer is incremented by 1. In block 818, check sum is calculated. In block 820, the learn flag is set. In block 822, the learn flag is stored in EEPROM bank indicated by the pointer, then control passes to block 250.

Figure 30:
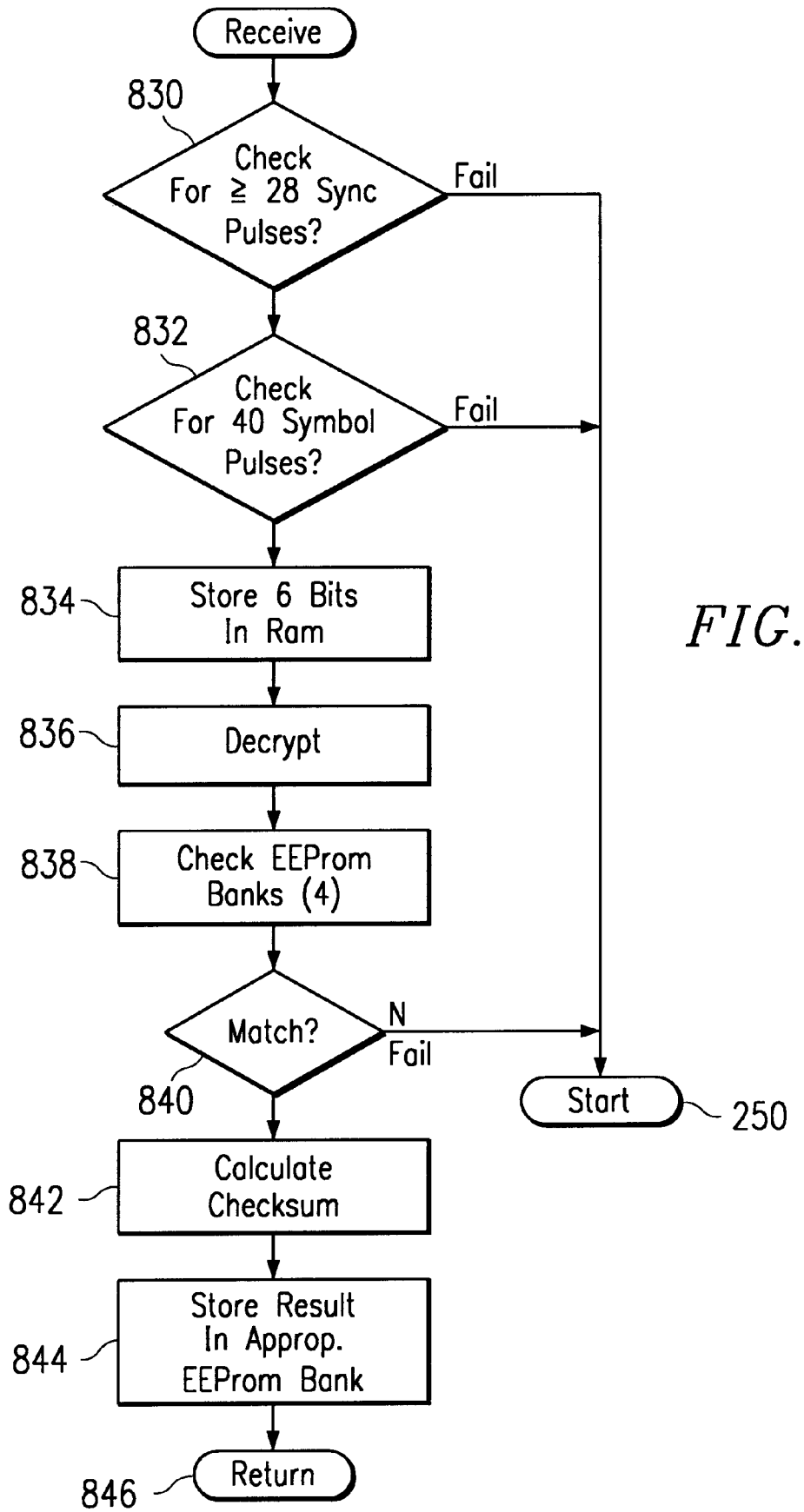
FIG. 30 illustrates an overall diagram of the receive mode.

FIG. 30 illustrates the operation of the receive mode. In block 830, it is determined if 8 sync pulses have been received. If less than 8 sync pulses have been received, then block 250 is executed. In block 832, it is determined if 40 symbol pulses have been received, if not, block 250 is executed. In block 834, 6-bits are stored in RAM. In block 836, decrypt is executed. In block 838, the EEPROM banks are checked. In decision block 840, if no matches are obtained, then block 250 is executed. In block 842, the check sum is calculated. In block 844, the result is stored in the appropriate EEPROM bank. In block 846, the flow ends with a return to block 250.

Figure 31:
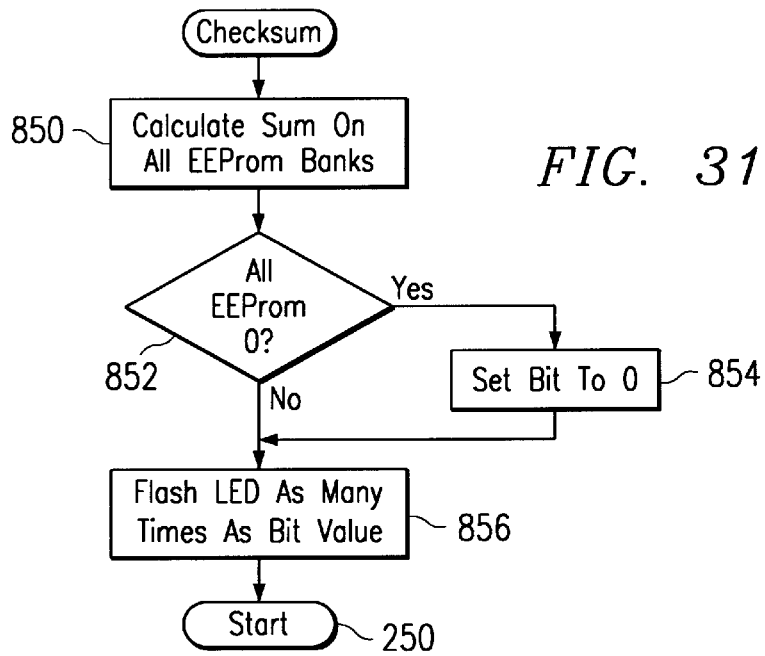
FIG. 31 illustrates an overall diagram of the check sum.

In FIG. 31, operation of the check sum has begun. In block 850, the sum of all EEPROM banks are determined. In block 852, if all the EEPROMs are 0, then the bit is set to 0 in block 852. If not, then in block 856, the LEDs are flashed as many times as the bit value to provide an indication of an error. Next, block 250 is executed.

Figure 32:
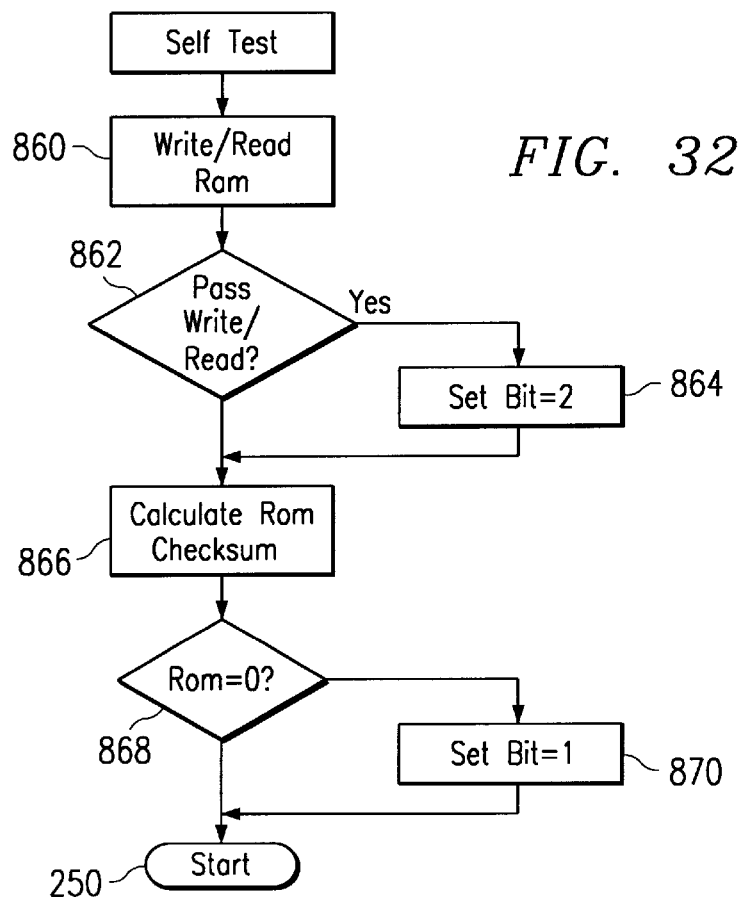
FIG. 32 illustrates an overall flow chart of the self-test.

In FIG. 32, the overall flow of self-test is illustrated. In block 860, the RAM is first written and then read. In decision block 862, it is determined if the write/read has been a success. If it has, then in block 864, the set bit is set to equal to 2. In block 866, check-sum for the ROM is calculated. In decision block 868, it is determined if the check-sum equals 0. If yes then the appropriate bit is set equal to 1 in block 870. Finally, block 250 is executed.

Figure 33:
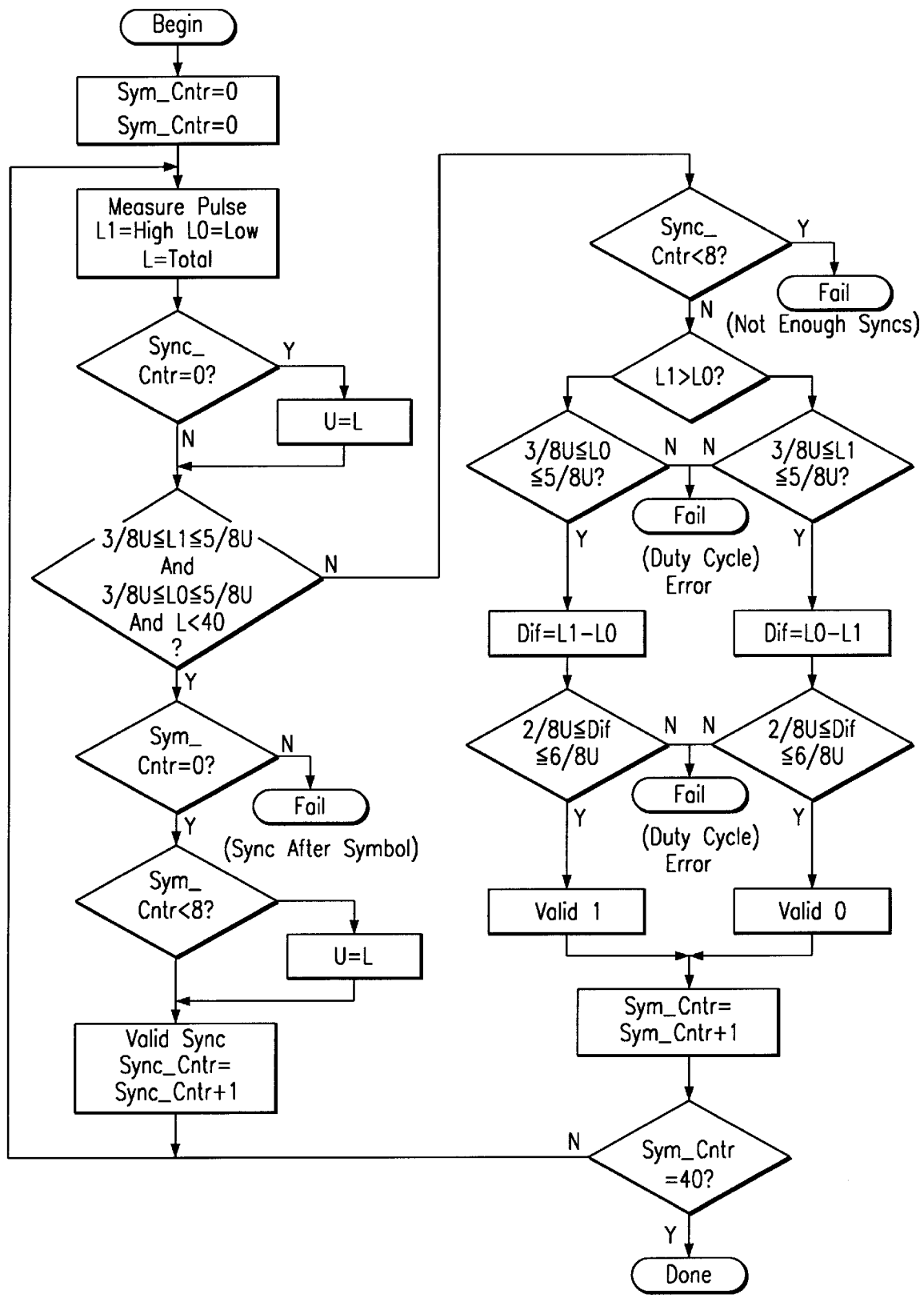
FIG. 33 illustrates an flow of the decode algorythm.

FIG. 33 illustrates an flow of the decode algorythm. While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed:

1. A computer implemented method for transmitting or receiving an information signal, comprising the steps of:

establishing a start position for a receive mode to receive the information signal;

returning to said start position when less than or equal to 8 sync pulses are received to identify a transmission of said information signal; and returning to said start position when 40 symbols are not received to provide data while in said receive mode.

2. A computer implemented method, as in claim 1, wherein said method further includes the step of returning to the start position if memory banks are unequal.

3. A computer implemented method for transmitting or receiving an information signal, comprising the steps of:

establishing a start position for a learn mode to learn an access code;

returning to said start position when less than or equal to 8 sync pulses are received to identify a transmission of said information signal; and returning to said start position when 40 symbols are not received to provide data while in said learn mode.

* * * * *